(12) United States Patent
Higo et al.

(10) Patent No.: US 11,551,134 B2
(45) Date of Patent: Jan. 10, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Tomoaki Higo, Kawasaki (JP); Masaki Inaba, Tokyo (JP); Takayuki Yamada, Kawasaki (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1398 days.

(21) Appl. No.: 15/845,922

(22) Filed: Dec. 18, 2017

(65) Prior Publication Data
US 2018/0181885 A1 Jun. 28, 2018

(30) Foreign Application Priority Data
Dec. 22, 2016 (JP) .............................. JP2016-249170

(51) Int. Cl.
*G06F 17/00* (2019.01)
*G06N 20/00* (2019.01)
(Continued)

(52) U.S. Cl.
CPC .......... *G06N 20/00* (2019.01); *G06F 16/9017* (2019.01); *G06F 40/242* (2020.01); *G06F 40/279* (2020.01)

(58) Field of Classification Search
CPC .... G06F 40/169; G06F 40/242; G06F 40/279; G06F 16/9017; G06N 20/00
See application file for complete search history.

(56) References Cited

U.S. PATENT DOCUMENTS 8,713,023 B1* 4/2014 Cormack ................ G06F 16/93
707/740
9,087,303 B2* 7/2015 Rinott .................... G06Q 10/10
(Continued)

FOREIGN PATENT DOCUMENTS

JP 2011203991 A 10/2011
JP 2012194691 A 10/2012
(Continued)

OTHER PUBLICATIONS

Satoshi Oyama, et al., Accurate Integration of Crowdsourced Labels Using Workers' Self-reported Confidence Scores, IJCAI International Joint Conference on Artificial Intelligence, pp. 1-4, 2013.

*Primary Examiner* — Mohammed H Zuberi
(74) *Attorney, Agent, or Firm* — Canon U.S.A., Inc. IP Division

(57) ABSTRACT

An information processing apparatus includes an obtaining unit configured to obtain information of a plurality of labels applied to the learning data by a plurality of users, information regarding reliability of each applied label itself, and information regarding reliability of a user who applies the relevant label, wherein the information of the label is information regarding a result to be recognized in a case where the predetermined recognition is performed on the learning data and a determination unit configured to determine a label to the learning data from among the plurality of labels based on the reliability of the label itself and the reliability of the user who applies the relevant label.

19 Claims, 18 Drawing Sheets

(51) Int. Cl.
 *G06F 16/901* (2019.01)
 *G06F 40/242* (2020.01)
 *G06F 40/279* (2020.01)

(56) References Cited

U.S. PATENT DOCUMENTS

| | | | | |
|---|---|---|---|---|
| 9,760,622 | B2* | 9/2017 | Ravid | G06F 16/355 |
| 10,002,182 | B2* | 6/2018 | Ravid | G06F 16/285 |
| 10,229,117 | B2* | 3/2019 | Cormack | G06F 16/93 |
| 10,445,379 | B2* | 10/2019 | Gusev | G06F 17/18 |
| 10,504,037 | B1* | 12/2019 | Anant | G06Q 50/18 |
| 10,902,066 | B2* | 1/2021 | Puzicha | G06F 16/93 |
| 2008/0086432 | A1* | 4/2008 | Schmidtler | G06F 16/353 |
| | | | | 706/14 |
| 2010/0312725 | A1* | 12/2010 | Privault | G06N 5/043 |
| | | | | 706/54 |
| 2011/0238605 | A1* | 9/2011 | Tateno | G06F 16/353 |
| | | | | 706/12 |
| 2012/0216257 | A1* | 8/2012 | Steiner | G06Q 50/01 |
| | | | | 726/4 |
| 2012/0278266 | A1* | 11/2012 | Naslund | G06N 20/00 |
| | | | | 706/45 |
| 2013/0132308 | A1 | 5/2013 | Boss et al. | |
| 2016/0373657 | A1* | 12/2016 | Goetzke | G06N 7/005 |
| 2021/0089963 | A1* | 3/2021 | Baek | H04L 67/306 |
| 2021/0158209 | A1* | 5/2021 | Xiang | G06F 16/90335 |
| 2022/0108082 | A1* | 4/2022 | Morris | G06F 40/30 |

FOREIGN PATENT DOCUMENTS

| | | |
|---|---|---|
| JP | 2013120534 A | 6/2013 |
| JP | 2015129988 A | 7/2015 |
| JP | 2016062544 A | 4/2016 |
| JP | 2016115245 A | 6/2016 |

\* cited by examiner

FIG.4
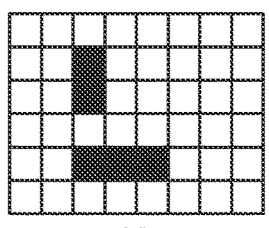
10
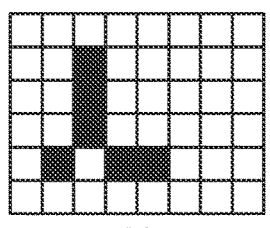
11
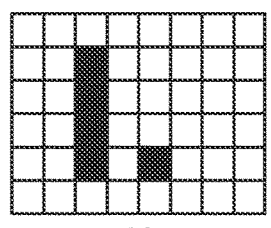
12
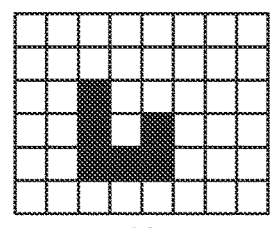
13
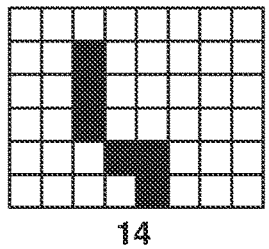
14
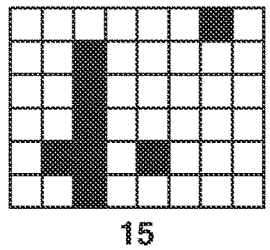
15
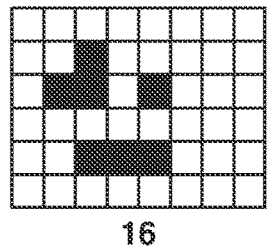
16
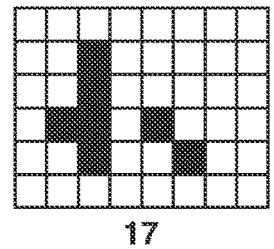
17
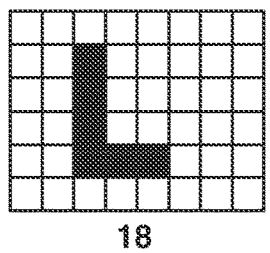
18

INFORMATION PROCESSING APPARATUS, INFORMATION PROCESSING METHOD, AND STORAGE MEDIUM

BACKGROUND

Field of the Disclosure

The present disclosure relates to a labeling technique for applying a label to data.

Description of the Related Art

Techniques for constructing prediction models from data groups and calculating prediction to query data pieces by supervised machine learning are used in various field such as object recognition. The supervised learning accompanies an operation for labeling learning data pieces in advance to apply a label expected as an output result together with query data. Generally, as the number of the labeled learning data pieces to which correct labels are applied increases, accuracy of the prediction model is improved. Thus, methods for labeling learning data pieces using a large amount of manpower and methods for automatically performing labeling have been conventionally proposed.

Japanese Patent Application Laid-Open No. 2016-62544 describes a method for automatically performing labeling by calculating a ranking of distances in a plurality of characteristics among learning data pieces.

However, a method using a large amount of manpower includes variation of each person, and there is a possibility that a false label is applied. In addition, according to the method described in Japanese Patent Application Laid-Open No. 2016-62544, there is no choice but to trust the result of labeling automatically performed, and a countermeasure to a case when an error occurs in labeling is not considered.

SUMMARY

The present disclosure is directed to determining appropriately a label when a false label is applied by learning data.

An information processing apparatus according to the present disclosure includes an obtaining unit configured to obtain information of a plurality of labels applied to the learning data by a plurality of users, information regarding reliability of each applied label itself, and information regarding reliability of a user who applies the relevant label, wherein the information of the label is information regarding a result to be recognized in a case where the predetermined recognition is performed on the learning data and a determination unit configured to determine a label to the learning data from among the plurality of labels based on the reliability of the label itself and the reliability of the user who applies the relevant label.

Further features of the present disclosure will become apparent from the following description of exemplary embodiments with reference to the attached drawings.

BRIEF DESCRIPTION OF THE DRAWINGS

FIG. 4 illustrates examples of label determination of an area designation type according to one or more aspects of the present disclosure.

DESCRIPTION OF THE EMBODIMENTS

Figure 18:
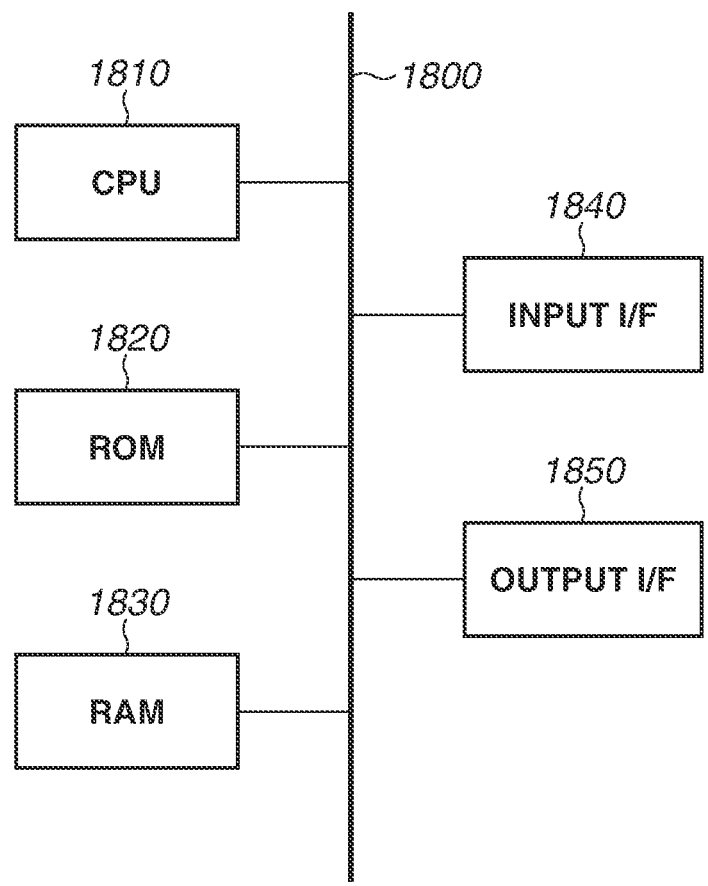
FIG. 18 illustrates an example of a hardware configuration of an information processing apparatus according to one or more aspects of the present disclosure.

Before describing each exemplary embodiment according to the present disclosure in detail, a hardware configuration of an information processing apparatus according to each exemplary embodiment is described with reference to FIG. 18. In FIG. 18, a central processing unit (CPU) 1810 comprehensively controls each device connected via a bus 1800. The CPU 1810 reads out and executes a processing step and a program stored in a read-only memory (ROM) 1820. Each processing program, device driver, and the like including an operating system (OS) according to the present exemplary embodiment which are stored in the ROM 1820 are temporarily stored in a random access memory (RAM) 1830 and executed by the CPU 1810 appropriately. An input interface (I/F) 1840 inputs an input signal in a format which can be processed by the information processing apparatus from an external apparatus (an image capturing apparatus or the like). An output I/F 1850 outputs a processing result by the information processing apparatus according to the present disclosure as an output signal to the external apparatus in a format which can be processed by the external apparatus.

An information processing apparatus 10000 according to a first exemplary embodiment stores a result that a person or an algorithm (i.e., a labeler) labels each learning data in association with reliability of the labeler and a confidence degree of labeling by each labeler as attribute information pieces. Further, the information processing apparatus 10000 determines a likely label based on a label applied to a target learning image and a reliability of the label. A person or an algorithm performing labeling is referred to as a labeler appropriately.

Figure 1:
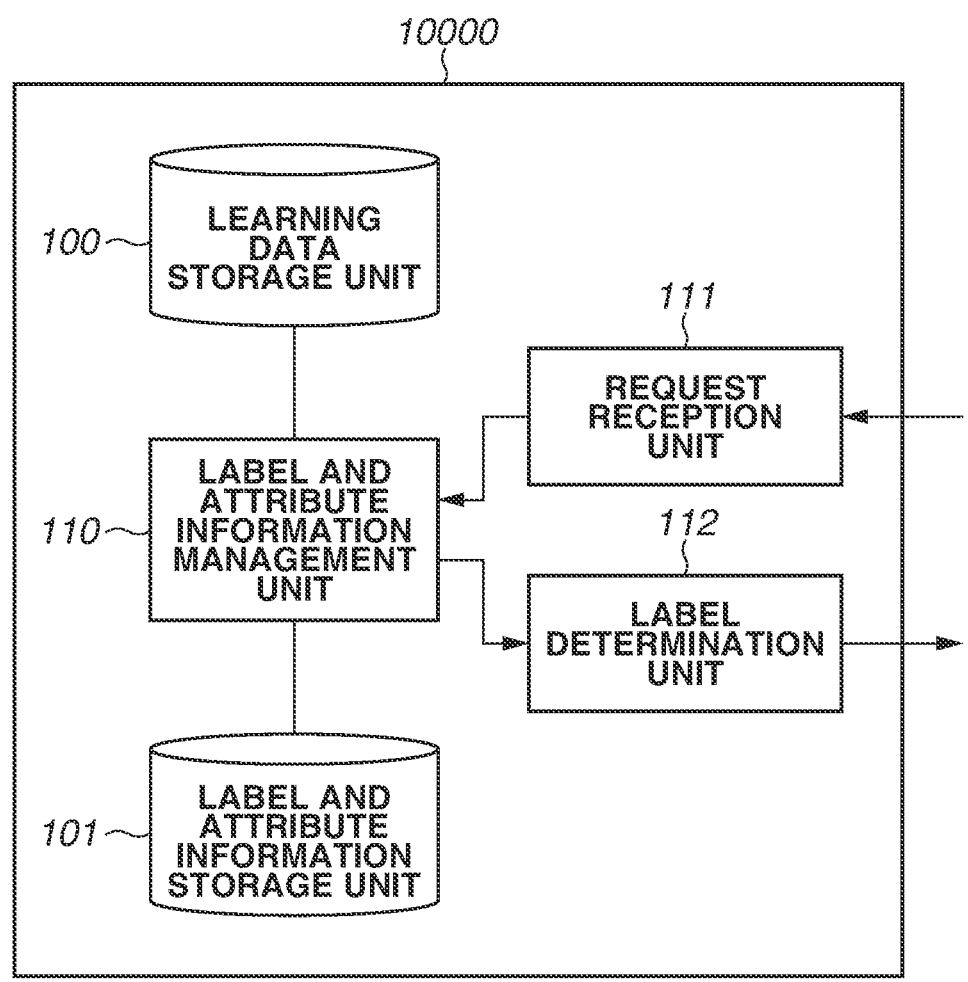
FIG. 1 is a block diagram illustrating an example of a configuration of a labeling system according to one or more aspects of the present disclosure.

FIG. 1 is a block diagram illustrating an example of a configuration of an information processing apparatus (a labeling apparatus) 10000 according to the first exemplary embodiment.

A learning data storage unit 100 stores an assembly of learning data pieces (plural storage). Learning data is, for example, an image, and each image includes an object to be a labeling target. An object is, for example, a person, a dog, a cat, a car, and a building. The learning data is used to generate a classifier. For example, when learning data is an image capturing a person, a dog, a cat, or the like as an object, and information representing the object is correctly applied thereto as a label, a classifier for identifying an object in image data including unknown object can be generated by performing machine learning using the learning data. According to the present exemplary embodiment, an image is described as an example of learning data, and thus an image is sometimes referred to as a learning image.

A label and attribute information storage unit 101 stores an assembly of labeled results by a labeler to each of the learning data pieces and attribute information pieces accompanying the results. The labeled result is used as a teaching signal of the machine learning and, for example, a label "cat" which is applied to an image of a cat by the labeler. On the other hand, the attribute information includes label attribute information corresponding to the applied label, labeler attribute information corresponding to the labeler who applies the label, and data attribute information as attribute of the learning data. The label attribute information includes an identification (ID) indicating the labeler, a date and time when the labeler performing labeling, a confidence degree indicating a degree how the labeler can perform labeling correctly. In the case where the labeler is a person, when the person is sure that an object in an image is, for example, a cat, a high value is applied as the confidence degree, and when the person wonders whether the object is a cat or a dog, a low value is applied as the confidence degree. A value of the confidence degree is, for example, a real number from zero to one, however, the value is not limited to this example. In the case where the labeler is an algorithm (a classifier), for example, when it is determined whether an object is a cat using a cat classifier on an image, a likelihood representing a cat likeness may be used as the confidence degree.

The labeler attribute information is reliability of the labeler. The reliability is an expected value that the label applied by the labeler is thought to be correct. For example, reliability of a labeler who always labels correctly any image is high, and in contrast, reliability of a labeler who has a high rate of false labeling is low. The data attribute information is information inherent in the learning data, for example, a date and time when the image data is captured, an image capturing parameter, a labeling method described below, a determined label, and a certainty degree.

Figure 2:
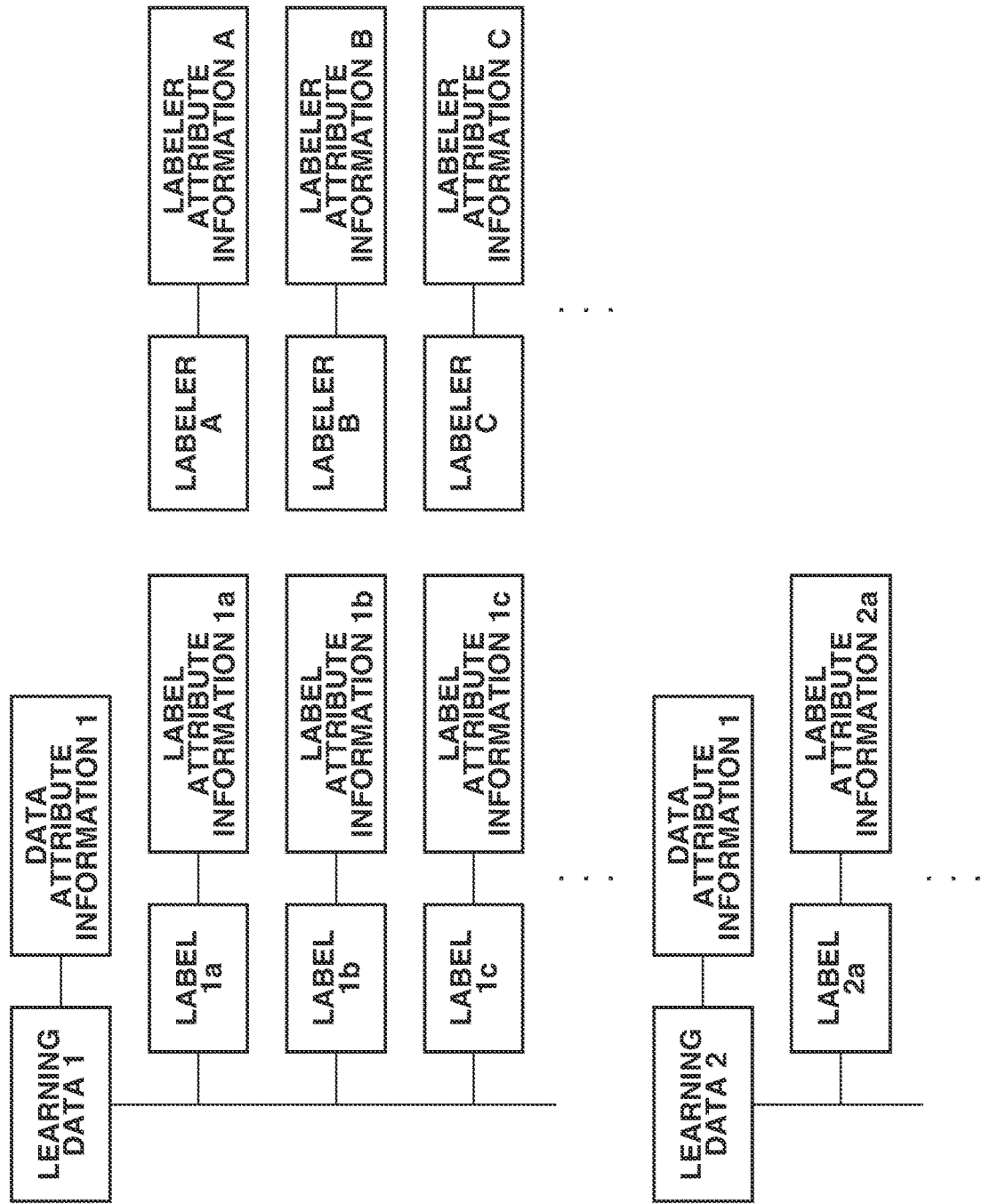
FIG. 2 illustrates an example of correspondence relationships among pieces of data, labels, and attribute information to be managed according to one or more aspects of the present disclosure.

A label and attribute information management unit 110 manages and stores a correspondence relationship between learning data and label and attribute information. Data pieces are stored as a table in a memory not illustrated. FIG. 2 illustrates an example of correspondence relationships among pieces of data, labels, and attribute information to be managed. Each learning data in a learning data group is associated with the data attribute information corresponding to each data and a plurality of labels. As examples, the data attribute information includes a date and time when the data is obtained, parameter information of a camera used for capturing an image, and a type of the labeling method. As examples of labels, an image as learning data 1 is associated with a plurality of labels namely, "cat" as a label 1*a*, "dog" as a label 1*b*, and "cat" as a label 1*c*. In addition, each label is imparted with the above-described label attribute information correspondingly. The learning data is associated with a plurality of labels, and a label is determined like majority voting by a method described below. Accordingly, effects of an accidental labeling error and a labeling error by a malicious labeler can be reduced. Every time the label applied to the learning data and the attribute information of the label are received, the label and attribute information management unit 110 associates the learning data 100 with the label and attribute information in the above-described form.

When a request to refer the label corresponding to the learning data is received from the outside, a request reception unit 111 makes an inquiry to the label and attribute information management unit 110 and transmits the label and the attribute information corresponding to the designated learning data (target learning data) to a label determination unit 112. The designated learning data may be one each or a group of a plurality of data pieces.

The label determination unit 112 determines a likely label based on the label and the attribute information corresponding to the learning data received from the label and attribute information management unit 110. The method for determining the label is described in detail below.

First, when there is no label corresponding to the learning data received by the request reception unit 111, the label determination unit 112 returns a replay that a label is unknown. If a label candidate is known in advance, a label may be randomly selected from the label candidates and returned. When there is a plurality of labels corresponding to the designated learning data, a determined label is selected from the label candidates by scoring. It is regarded that n pieces of labels exist with respect to the learning data, and an i-th (i=1, ... , n) label is an L(i). Further, when the label L(i) includes m types, namely I_1, ... , I_m, of labels which are different each other, the label candidate of which a score is the largest in m pieces of the label candidates may be returned as the determined label. A calculation method (evaluation) of scoring is described. The confidence degree to labeling, the corresponding labeler, and the reliability of the labeler are respectively represented as C(i), A(i), and R(A(i)). A score S(j) (j=1, ... , m) of each label candidate is calculated (derived) by a following formula.

[Formula 1]

$$S(j) = \Sigma_{i|L(i) \in I_j} f_1(C(i)) * f_2(R(A(i))) \quad (1)$$

Figure 3:
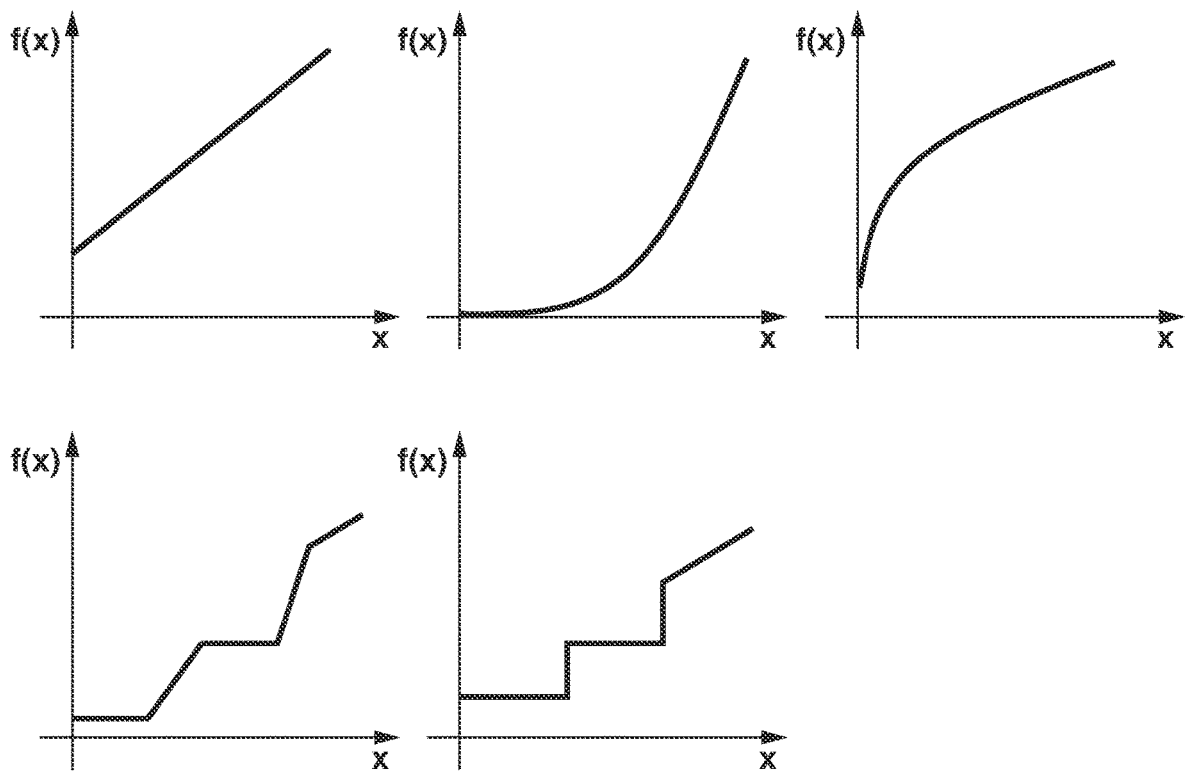
FIG. 3 illustrates examples of monotonically increasing functions f(x) according to one or more aspects of the present disclosure.

A function f(x) monotonically increases with respect to x and can be various functions f(x) as illustrated in FIG. 3 as examples. When the function f is adjusted, conditions can be changed such as a score is not given to a label of which the reliability of the labeler is a certain value or lower, and a label of which the confidence degree to labeling is extremely high is greatly depended. For example, f_1(x)=f_2(x)=x. Further, the score S(j) is calculated for each label candidates I_j, and a label I_j when the score S(j) becomes a maximum value may be regarded as the determined label. As described above, the maximum value of the score S(j) is selected, and thus a labeler having higher reliability, a label having a higher confidence degree, and a label with more same labels are selected as the determined label. Thus, an effect of a label which has a low confidence degree and is highly likely a false label may be reduced, and if a malicious labeler applies a false label, the reliability of the malicious labeler is lower, so that a negative effect on label determination can be reduced. Further, it is described that the confidence degree C(i) and the reliability R (A(i)) can be obtained from the attribute information in the formula (1), however, the confidence degree may be applied using the above-described method according to the present exemplary embodiment. Regarding evaluation of the reliability (the reliability derivation), for example, a rate of applying a label same as the label determined in the past is calculated for each labeler, and the calculated value may be regarded as the reliability, or the labeler is caused to label a plurality of data pieces of which correct labels are determined in advance, and a rate of correct answers may be regarded as the reliability. In addition, calculation may be performed by regarding any one of or both of the confidence degree and the reliability are constant values.

However, when no different label (m=1) exists in the label L(i), there is no need to perform scoring, and a common label L(i)=I_1 may be regarded as the determined label in all "i".

According to the present exemplary embodiment, a case of a "symbol designation type" labeling is described in which some sort of names and good or bad is designated as a label, a scope of application of the present disclosure is not limited to this case. For example, the present disclosure can be applied to a case of an "area designation type" labeling which is labeling for enclosing a face area in an object captured in an image with a bounding box and labeling for filling a road area captured in an image with color. Specifically, a label can be determined using a following method.

Figure 5:
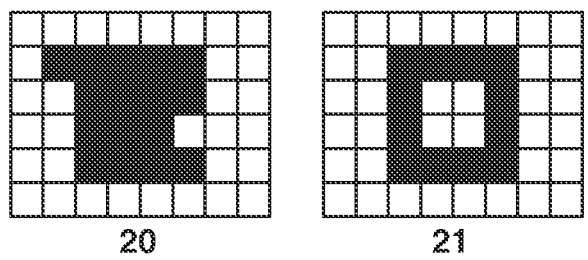
FIG. 5 illustrates an example of processing on bounding boxes according to one or more aspects of the present disclosure.

In the case of the area designation type labeling, True or False (pixel label) is designated to a certain learning data image as learning data (pixel learning data) independent for each pixel. For example, when a person area in an image is detected, labeling may be performed in such a manner that a pixel in the area in which the person is captured is designated as True, and a pixel in an area other than that is designated as False. As a method for designating an area, there are, for example, a bounding box which designates a rectangular area enclosing a target person on an image, and a method for filling pixels in a target person area with color. When a label is determined from a learning data image group labeled by the above-described method, a pixel label is determined for each pixel by the formula (1). FIG. 4 illustrates examples of label determination of the area designation type. FIG. 4 illustrates labeled results 10 to 17 in which specific areas are filled with color in images. The pixel label is determined for each pixel with respect to a plurality of the labels. For example, when a third pixel from the left on a second line from the top is focused, there are seven results 10, 11, 12, 14, 15, 16, and 17 in which the relevant pixel is filled with color (black) and one result 13 in which the relevant pixel is not filled with color (white) in FIG. 4. In the formula (1), when the confidence degree and the reliability are regarded as 1, 0, and f_1=f_2=x regardless of the label for sake of simplicity, the pixel label can be determined as black since the score S (black)=7, and the score S (white)=1. When this processing is performed on each pixel, a result 18 illustrated in FIG. 4 is obtained, and the result 18 can be used as the determined label of the image. In the case of the bounding box, there is a case in which a determined pixel label representing inside of the bounding box does not have a rectangular shape as a result 20 in FIG. 5, however, in such a case, the bounding box may be set by being approximated by a rectangular frame as shown in a result 21 in FIG. 5.

In addition, a "numerical value designation type" labeling can be considered in which a numeric array such as a matrix and a vector representing an image or coordinate values and an orientation in a three-dimensional space of a target object is designated as a label. In the case of the numerical value designation type label, a numerical value of the label can be determined as a weighted average value using the score S(j) in the formula (1) as a weight in each label. However, a value may be determined by, for example, performing robust estimation such as M estimation, which is a known technique, in consideration of an outlier or using random sample consensus (RANSAC), which is a known technique, by assuming some model without being limited to the weighted average.

Figure 6:
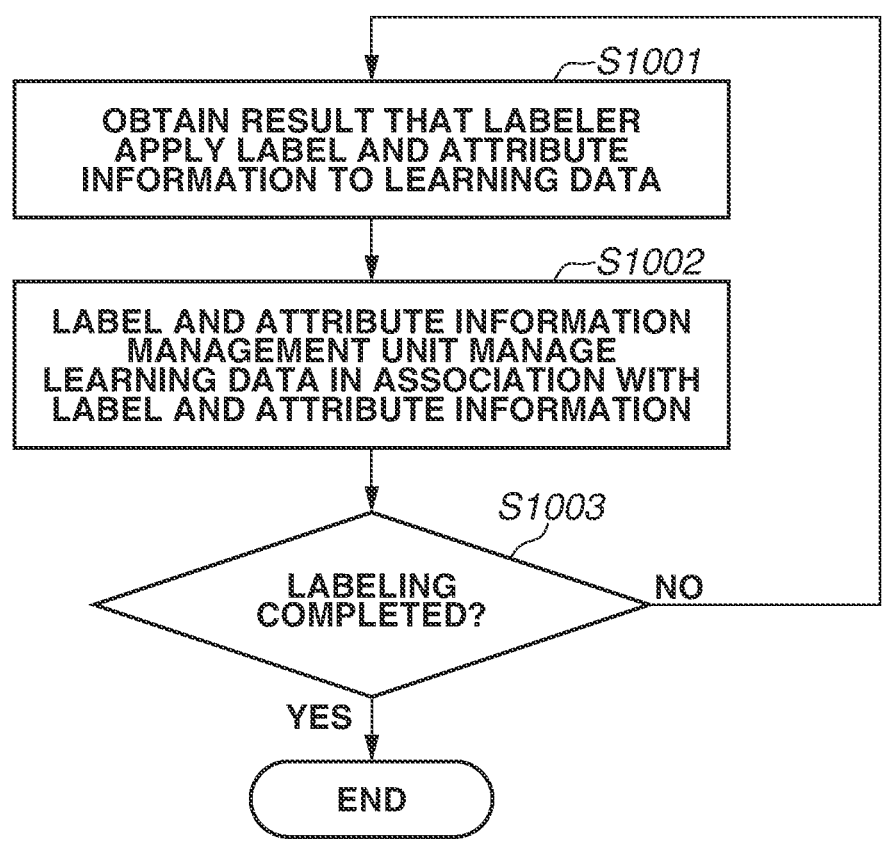
FIG. 6 is a flowchart illustrating processing for labeling.

Next, a processing procedure of the information processing apparatus 10000 according to the present exemplary embodiment is described with reference to FIGS. 6 and 7. As a major processing flow, labeling processing is performed on the learning data, and subsequently, processing for determining a label corresponding to the learning data is performed. However, it can be returned to the labeling processing after determining the label.

First, labeling processing performed on the learning data is described. FIG. 6 is a flowchart illustrating labeling processing. In step S1001, the label and attribute information management unit 110 obtains a result that a labeler applies a label and attribute information to the learning data and stores the result in the label and attribute information storage unit 101. The attribute information may be directly input by the labeler, and a date and a time when the labeling is performed and an ID of the labeler in the label attribute information may be automatically extracted from the information processing apparatus performing labeling.

Next, in step S1002, the label and attribute information management unit 110 manages the learning data in association with the label and attribute information in a format as described above in FIG. 2. As a unit to be labeled at a time in steps S1001 and S1002, the label and attribute information management unit 110 may associate the learning data with each label or associate a plurality of the learning data pieces with a plurality of labels at once without depending on the number of the learning data pieces and the number of labels.

Next, in step S1003, the label and attribute information management unit 110 checks whether labeling is completed, and when the labeling is completed (YES in step S1003), processing for determining the label is ready to be performed. When the labeling is not completed (NO in step S1003), the processing returns to step S1001. A criterion for determining whether the labeling is completed is determined whether sufficient labels for determining the label are applied to the learning data. For example, when x or more pieces of labels are applied to each learning data, it may be determined that labeling is completed. However, the criterion is not limited to the above-described one, and it may be determined that the labeling is completed when a certainty degree exceeds a threshold value which is described below in a third exemplary embodiment.

Each function unit described herein is implemented by the CPU 1810 loading a program stored in the ROM 1820 to the RAM 1830 and executing processing according to each flowchart described below. Further, for example, when hardware is constituted as an alternative to software processing using the CPU 1810, an arithmetic unit and a circuit may be constituted so as to correspond to processing of each function unit described herein.

Figure 7:
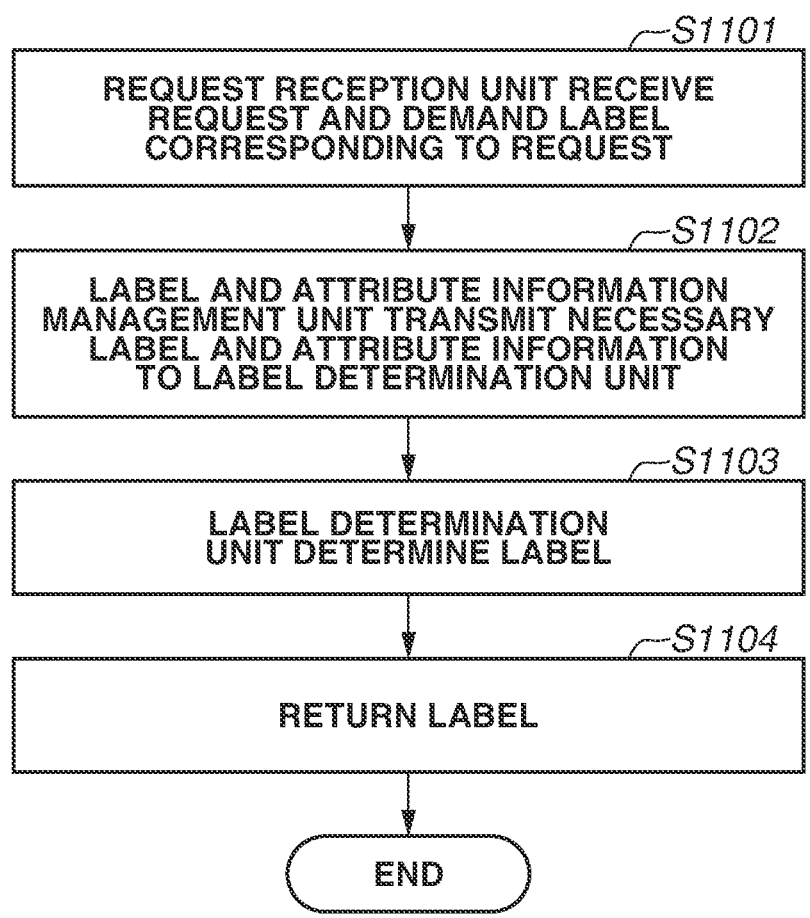
FIG. 7 is a flowchart illustrating processing for determining a label according to one or more aspects of the present disclosure.

FIG. 7 is a flowchart illustrating a processing flow by the information processing apparatus 10000 according to the present exemplary embodiment. In step S1101, the request reception unit 111 receives a request from a user and a system. A content of the request is, for example, "return a label corresponding to certain learning data". When receiving the request, the request reception unit 111 transmits an ID of the designated learning data to the label and attribute information management unit 110 and requests the label thereof. In this regard, the learning data to be requested is not limited to one and may be a plurality of pieces, and in this case, a plurality of IDs of the learning data pieces is transmitted to the label and attribute information management unit 110 correspondingly.

Next, in step S1102, the label and attribute information management unit 110 determines a label and attribute information corresponding to the learning data ID received from the request reception unit 111 and transmits the label and the attribute information to the label determination unit 112.

Next, in step S1103, the label determination unit 112 performs scoring on the label candidates based on the formula (1) and determines a label.

In step S1104, the label determination unit 112 returns the determined label to the user and the system which made the request.

The present exemplary embodiment is not limited to perform the processing in the order described above in FIG. 7. For example, the label and attribute information management unit 110 can transmit the label and the attribute information corresponding to the learning data in advance to the label determination unit 112, and the label determination unit 112 can determine the label and store the determined label in the data attribute information before receiving a request. In this case, when the request reception unit 111 requests a label in step S1101, the label and attribute information management unit 110 may transmit the determined label stored in the data attribute information to the label determination unit 112, and the label determination unit 112 may transmit the determined label as it is to the user and the system which made the request without performing calculation processing.

According to the present exemplary embodiment, the label and attribute information management unit manages a plurality of labels and various attribute information pieces with respect to each learning data, and the label determination unit appropriately determines a label form these information pieces, so that, if a part of labels includes an error, a correct label can be determined by suppressing an effect of the error.

An information processing apparatus 20000 according to a second exemplary embodiment of the present disclosure presents, in a case where a labeler is a user and when the user performs labeling, a label itself applied by another user and a similarity degree of a label which the user currently intends to apply and enables the user who performs labeling to efficiently perform labeling. In other words, according to the second exemplary embodiment, when a label applied by another user already exists in certain learning data, the already existing label is compared with a label and attribute information to facilitate labeling.

Figure 8:
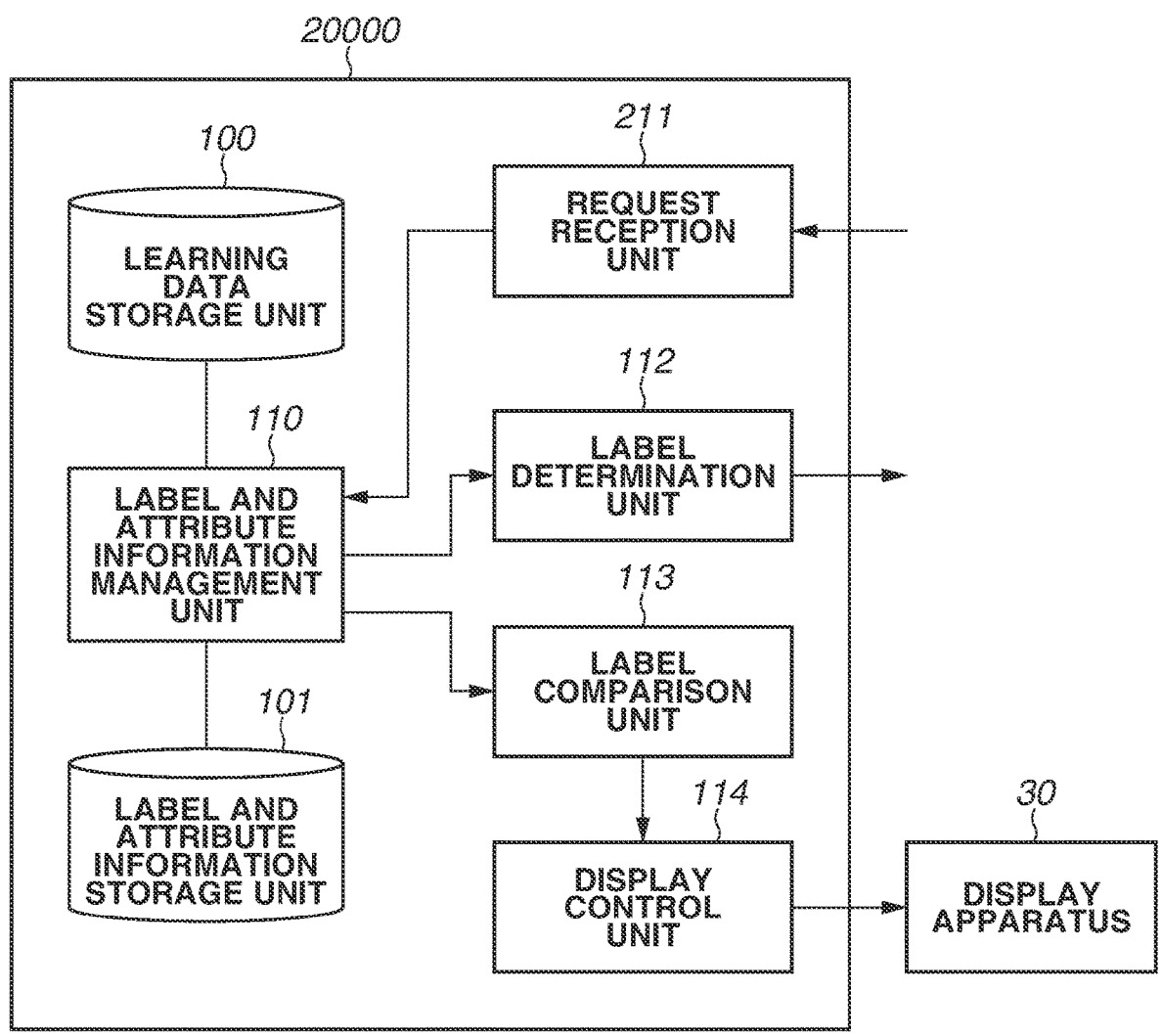
FIG. 8 is a block diagram illustrating an example of a configuration of a labeling confirmation system according to one or more aspects of the present disclosure.

FIG. 8 is a functional block diagram illustrating a configuration of a labeling apparatus 20000 according to the second exemplary embodiment. The configuration of the labeling apparatus 20000 according to the second exemplary embodiment includes portions in common with the example of the configuration according to the first exemplary embodiment illustrated in FIG. 1, so that a request reception unit 211, a label comparison unit 113, and a display control unit 114 which are different from the first exemplary embodiment are described. Further, the information processing apparatus according to the second exemplary embodiment is connected to a display apparatus 30 in a wired way or wirelessly. The display apparatus may adopt any display format, and the present exemplary embodiment is described as using a touch panel type display. However, an organic electroluminescence (EL) display, a cathode ray tube (CRT) display, and a projector which displays an image by projecting it on a wall and the like may be used as the display apparatus. In addition, a keyboard and a mouse may be used as an input device to the display apparatus instead of the touch panel.

The request reception unit 211 receives a request regarding a label to be referred to from a user and transmits the request to the label and attribute information management unit 110 in addition to the function according to the first exemplary embodiment. The label and attribute information management unit 110 transmits information pieces such as the label and the attribute information to the label comparison unit 113 and the display control unit 114 upon receiving an order from the request reception unit 211. The label comparison unit 113 receives two pairs of related labels from the label and attribute information management unit 110, calculates a similarity degree between labels, and transmits a label similarity to the display control unit 114. The display control unit 114 receives the label and the attribute information from the label and attribute information management unit 110, receives the label similarity degree from the label comparison unit 113, and causes, for example, the display apparatus 30 to display based on these information pieces.

As a user request that the request reception unit 211 receives from the user, for example, when the request is to "want to refer a label applied to certain learning data by each labeler", the label and attribute information management unit 110 extract a label in the designated learning data and transmits the label to the display control unit 114. A content to be displayed on the display apparatus 30 by the display control unit 114 is described in detail below.

The label comparison unit 113 calculates a similarity degree between two labels (a label A and a label B). First, calculation of a similarity degree in the symbol designation type labeling is described. When the label A is "cat", and the label B is also "cat", the label A and the label B are the same, and thus a similarity degree is 1.0. When the label A is "cat", and the label B is a "dog", the label A and the label B are different, and thus the similarity degree is 0. Further, for example, when a plurality of labels for enumerating objects captured in an image is applied, a similarity degree is calculated as (the number of labels common to the label A and the label B)/(the number of labels included in either one of the label A and the label B). For example, when the label A is "dog, cat, and monkey", and the label B is "dog, cat, horse, and cow", a similarity degree is (dog and cat: 2)/(dog, cat, monkey, horse, and cow: 5)=0.4. However, the calculation method of the similarity degree is not limited to the above-described formula, and a method can be adopted as long as a similarity degree between two labels is a higher value as labels are similar and is a lower value as labels are different. For example, when it is assumed that the label A is a label being edited by a user, and the label B is a label applied by another labeler, the label comparison unit 113 calculates a similarity degree and a coincidence degree therebetween, and the user can perform labeling while considering whether the label being edited is a likely label by referring to the similarity degree and the coincidence degree by a user interface (UI) described below.

The label comparison unit 113 can calculate not only a similarity degree but also a coincidence degree of the label. A coincidence degree is an index indicating how much a label applied by the user coincides with a plurality of labels applied by another labeler. More specifically, the coincidence degree can be obtained by (a total sum of a similarity degree of the labels applied by the user and the labels applied by the other labeler)/(the number of labels applied by the other labeler) with respect to certain learning data. As a method for selecting label groups with respect to the certain learning data, for example, all labels associated with the learning data may be selected. However, the selecting method is not limited to the above-described one, and labels of a labeler whose reliability is low and a label group excluding labels of which a confidence degree is low may be used, and the user may arbitrarily select a label group. The coincidence degree can be referred to by the display control unit 114 as with the similarity degree. The coincidence degree is calculated and referred to, and thus an error in labeling caused by a mistake and a malfunction can be reduced.

On the other hand, in calculation of the similarity degree in the area designation type labeling, the similarity degree is obtained from a rate with respect to the number of pixels based on whether a pixel label is the same or not for each pixel. A term w represents that a certain pixel is within the bounding box or filled with color, and a term b represents that a certain pixel is out of the bounding box or not filled with color. In a designated learning data image, a variable Nwb represents the number of pixels which has the label A and is classified as "w" and pixels which has the label B and is classified as "b", and variables Nww, Nbb, and Nbw are defined in a similar manner. A similarity degree Re of the label A and the label B is expressed by a following formula.

[Formula 2]

$$Re = \frac{N_{ww} + N_{bb}}{N_{ww} + N_{bb} + N_{wb} + N_{bw}} \quad (2)$$

When an inner area of the bounding box in an image is small, or an area filled with color is small, the variable Nww becomes predominantly large compared to other variables, and thus the similarity degree Re is very close to 1.0, and a difference is very small. In such a case, the similarity degree Re is calculated using the formula (2) by overwriting the value of Nww with the small value (for example, Nww=0), and thus the similarity degree can be calculated by weighting the designated area even the area is small.

Regarding calculation of the similarity degree in the numerical value designation type labeling, a difference d between values of the label A and the label B is calculated, a monotonically decreasing function g which is inverse to the function f in FIG. 3 is considered which approaches 1.0 when the difference d is zero and approaches 0.0 when the difference d becomes larger, and the similarity degree may be defined by g(d). The value d is defined as a difference between values of the label A and the label B here, however, the present exemplary embodiment is not limited to this value, and, for example, a L1 norm and a L2 norm may be used as the value d in the case that the label A and the label B are vectors and matrices.

Regarding calculation methods of the coincidence degrees in the area designation type and the numerical value designation type labeling, the descriptions thereof are omitted since the coincidence degrees can be calculated similarly by the method described in the symbol designation type after respectively calculating the similarity degrees.

Figure 9:
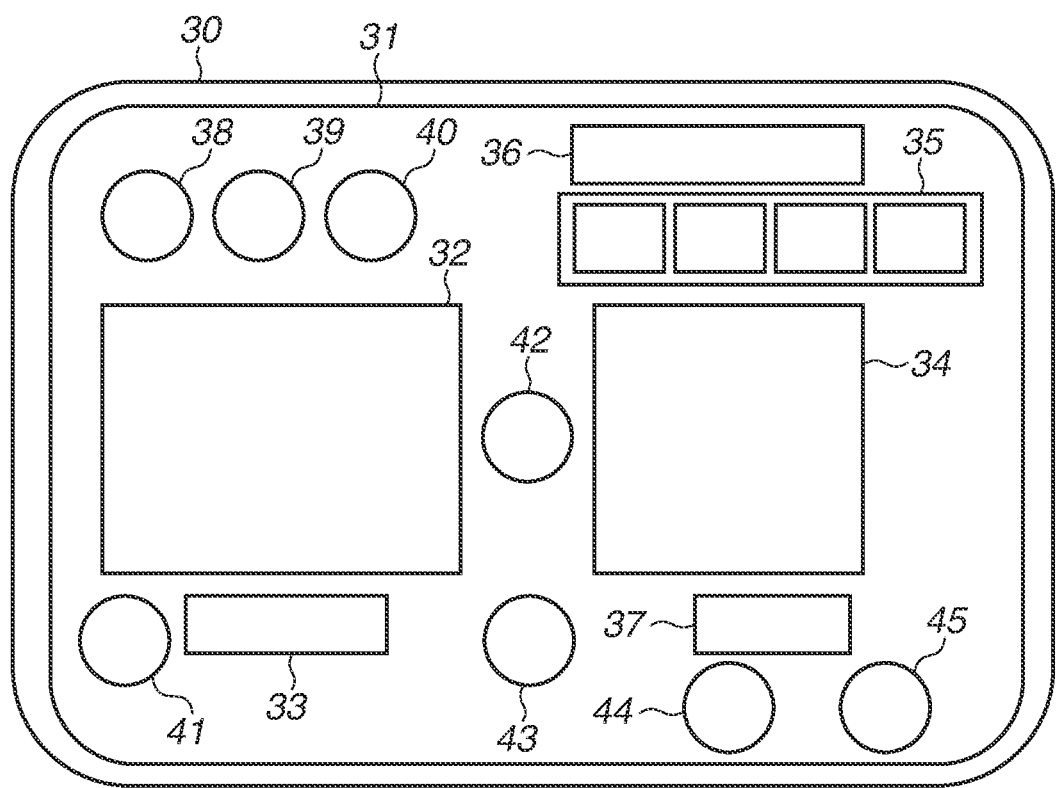
FIG. 9 illustrates an example of display for editing a symbol designation type label on a touch panel type display according to one or more aspects of the present disclosure.

The display control unit 114 receives necessary information from the label and attribute information management unit 110 and the label comparison unit 113 and performs display on the display apparatus 30 which is a touch panel type display. An external appearance and a function of the display apparatus 30 are described with reference to FIG. 9. FIG. 9 is an example of display for editing the symbol designation type label.

The display apparatus 30 is the touch panel type display and includes a touch panel liquid crystal display 31, labeling target image data 32, a label input portion 33 for the target image data, a label list 34 of the target image data, a thumbnail image data display area 35, a display condition setting portion 36, a similarity degree display portion 37, a labeling type switching button 38, a temporary storing button 39, an image switching button 40, a backward and forward button 41, a label transfer button 42, a confirmation button 43, a label determination button 44, and a label comparison button 45.

The display apparatus 30 has a function of displaying a content instructed by the display control unit 114 and a function of receiving a request received by the request reception unit 111. The display apparatus 30 may include functions of the label and attribute information management unit 110, the label determination unit 112, and the label comparison unit 113, or an external information processing apparatus includes these functions, and the display apparatus 30 may exchange information therewith via a communication unit.

The touch panel liquid crystal display 31 displays an image, a button, and the like. The touch panel liquid crystal display is described here, however, the display may not be a touch panel type, and in such a case, for example, a mouse may be used to perform a button operation and the like.

In the labeling target image data 32, an image of a target that a user currently labels is displayed. An arbitrary area in the displayed image can be enlarged or reduced by a user operation.

The label input portion 33 for the target image data is an area for editing a label regarding the image displayed on the labeling target image data 32. The label may be directly input with characters using a keyboard and the like or selected by a button or from a list when candidates to be selected as a label are determined. When labeling is performed on image data on which a user himself/herself has already labeled, the label that the user applied in the past can be displayed on the label input portion 33.

The label list 34 of the target image data is an area for displaying a list of labels already applied to the target image by the user himself/herself of another labeler. The user can think a label of the target image with reference to the label list 34. In addition, when the determined label has been obtained, the determined label is included in the label list 34.

In the thumbnail image data display area 35, a thumbnail of the learning data image is displayed. FIG. 9 illustrates an example in which four thumbnails are displayed, however the display is not limited to this example, and the display can be switched to a larger image, a smaller image, a file name, and the like. Further, the thumbnail image data display area 35 can be scrolled, and the user can browse another image by, for example, touching the display area with a finger or the like and sliding it to right and left. In addition, the number of applied labels and whether the determined label is registered to the data attribute information can be displayed as the thumbnails, and the user can select an image to be labeled next from these information pieces.

The display condition setting portion 36 is used to set a label to be displayed in the label list 34 or a condition of an image to be displayed on the thumbnail image data display area 35. Which condition is set can be switched in the display condition setting portion 36. As an example of the condition, the above-described "want to refer a label applied to certain learning data by each labeler" may be included. In a mode for setting a condition of the label list 34, for example, a condition for displaying only labels of which the confidence degree is greater than or equal to 0.8 and a condition for arranging the reliability of the labeler in descending order in the label list are set based on the label attribute information and the labeler attribute information and reflected to the label list 34. On the other hand, in a mode for setting a condition of the thumbnail image data display area 35, for example, a condition for displaying an image captured in 2016 or later and a condition for displaying only images of which labeled results are less than five pieces are set based on the data attribute information and the label attribute information, and thus a thumbnail image to be a target can be displayed on the thumbnail image data display area 35. As described above, the user refers to the image data pieces and labeled results corresponding to the set condition while filtering and sorting them and accordingly can improve labeling accuracy by more specifically visualizing a labeling rule. For example, the labeled results are displayed in descending order of the labeler reliability with respect to the same the image data, and thus the user can confirm a tendency of a likely label and improve the confidence degree of labeling. Further, a group of images applied with the same label is displayed as a thumbnail, and accordingly the user can understand a tendency of the images to be applied with the relevant label and can perform more accurate labeling. In addition, the user refers to the label that the user himself or herself applied before and can confirm that whether a labeling rule of himself or herself is wavered or not. In addition, a group of images labeled before a date when the labeling rule is changed is selected by performing filtering, and accordingly a label can be efficiently applied again only to the image group on which a new rule is not applied.

The similarity degree display portion 37 displays a similarity degree between a label set in the label input portion 33 and a label selected from the label list 34. The similarity degree is calculated by the above-described label comparison unit 113. In addition, the similarity degree display portion 37 can switch display of the similarity degree and display of the coincidence degree by a coincidence degree switching button, which is not illustrated. The coincidence degree is calculated by the above-described label comparison unit 113.

The labeling type switching button 38 is a button for switching the type of the labeling defined by a user, such as the symbol designation type labeling, the area designation type labeling, and the numerical value designation type labeling. When the labeling type is switched, an image data group to be a target is also changed, so that contents and the like in the labeling target image data 32, the label list 34, and the thumbnail image data display area 35 are updated. The case of switching the labeling type is described as an example, however, the present exemplary embodiment is not limited to this example. The image data groups can be switched, and when the image data group is designated, the labeling type may be updated according to the type of the labeling method in the data attribute information.

The temporary storing button 39 is a button for temporarily storing the content in the label input portion 33. The content is stored, and thus in the case that the display is switched to other image data and then returned to the previous image, the label can be edited again from the stored state. However, the temporary storing button 39 is not necessarily in a button form, and the content may be always automatically stored when the label input portion 33 is edited.

The image switching button 40 is used to switch the content of the labeling target image data 32. The content may be switched by designating a thumbnail image displayed on the thumbnail image data display area 35, or images may be randomly switched without designation.

The backward and forward button 41 is used to return to a previous history state by the backward button or to proceed to a next history state, if there is the next history state, by the forward button from a history of operation performed by a user.

The label transfer button 42 is used to select a label from the label list 34 and transfer the label same as the selected label to the label input portion 33.

The confirmation button 43 is used to determine the label written in the label input portion 33 and registers the label to the label and attribute information. When the confirmation button 43 is pressed, a screen for setting the confidence degree to the labeling by the user is displayed, and the confidence degree is stored as the attribute information at the same time. The confirmation button 43 is also used to display a message for prompting the user to confirm that there is no error in the label and an option of whether to edit the label in the case where a similarity degree between a label newly applied by the user and the determined label is low, or the newly applied label is greatly different from the tendency of the labels applied by the user himself or herself in the past. Accordingly, the user can reduce a possibility of registering a false label due to a malfunction and a mistake.

The label determination button 44 is used to determine the label using the label determination unit 112 based on a label group corresponding to the designated image data. When the label is determined, the determined label is added to or updated in the label list 34.

The label comparison button 45 is used to compare the label regarding the labeling target image data 32 being edited in the label input portion 33 with the label designated in the label list 34 using the label comparison unit 113 and calculate the similarity degree therebetween. The calculated similarity degree is displayed on the similarity degree display portion 37. The label comparison button 45 is described here, however, the present exemplary embodiment is not limited to this button, and label comparison and calculation of the similarity degree may be automatically performed every time the label is designated in the label list 34, and the similarity degree display portion 37 may be updated.

Figure 10:
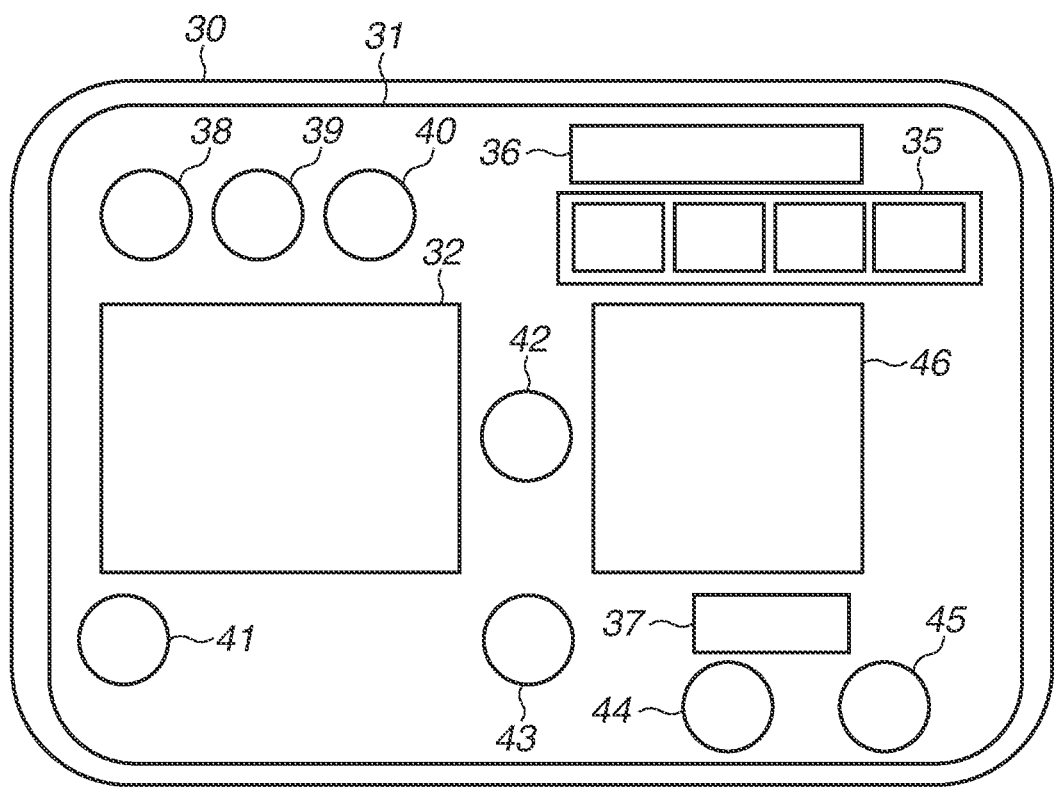
FIG. 10 illustrates an example of display for editing an area designation type label on a touch panel type display according to one or more aspects of the present disclosure.

Next, FIG. 10 illustrates an example of display for editing the area designation type label on the touch panel type display. Many functions in FIG. 10 are same as those in FIG. 9, and thus different functions are only described.

FIG. 10 includes comparison target labeling image data 46. A user can select the label already applied to the same image in the labeling target image data 32 and display the label by overlapping with the image data.

In the labeling target image data 32, an image which is a current target of labeling by the user is displayed as with the symbol designation type, however, a function of labeling by designating an area on the image is added. Accordingly, the processing performed on the label input portion 33 in FIG. 9 is integrated as the function of the labeling target image data 32.

As a thumbnail image displayed on the thumbnail image data display area 35, not only thumbnail display of the learning data image as with the symbol designation type but also a thumbnail of an image in which a labeled result is overlapped on the labeling target image data can be displayed. Accordingly, in the display condition setting portion 36, the user can further set a condition by designating a category of an image on which the labeled result is overlapped.

The similarity degree display portion 37 displays the similarity degree between the label set in the labeling target image data 32 and the label in the comparison target labeling image data 46.

The label transfer button 42 transfers the label displayed in the comparison target labeling image data 46 as the label being edited in the labeling target image data 32. Accordingly, the user can efficiently select the label from labels applied in the past, edit and apply the label.

It is described above that various buttons are displayed on the touch panel liquid crystal display 31, however, a processing content may be selected from a list or assigned to a shortcut key instead of the buttons without being limited to the above-described configuration.

An example of display for editing the numerical value designation type label is similar to that of the symbol designation type excepting a point that a numerical value is input as a label instead of selecting symbols as character input in the example of the symbol designation type illustrated in FIG. 9, so that description thereof is omitted.

Figure 11:
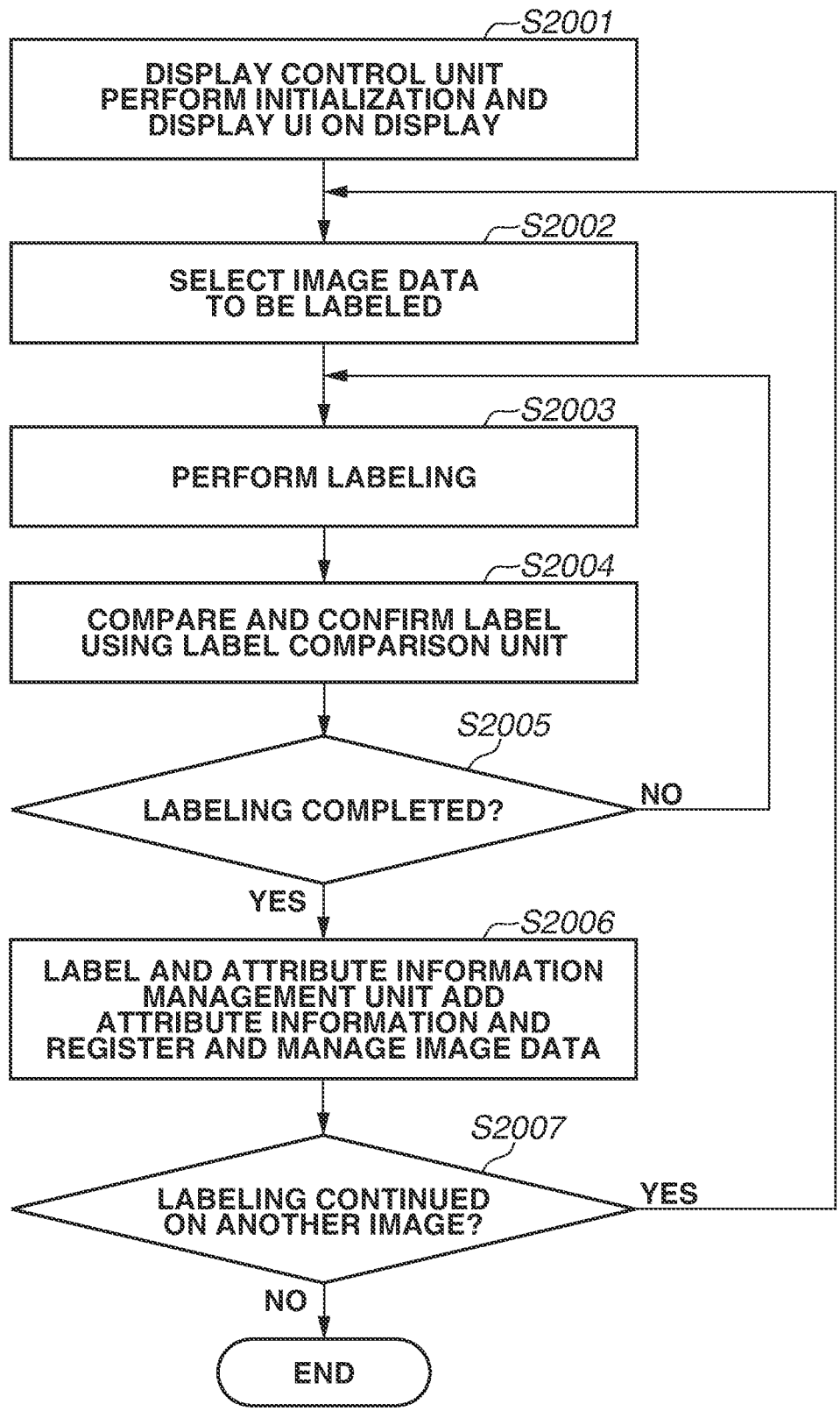
FIG. 11 is a flowchart illustrating a typical flow for applying and confirming a label using the labeling confirmation system according to one or more aspects of the present disclosure.

Next, FIG. 11 illustrates a typical flow for applying and confirming the label using the information processing apparatus according to the present exemplary embodiment. Processing flows are approximately similar in any of the symbol designation type, the area designation type, and the numerical value designation type labeling and thus described together with reference to FIG. 11. In step S2001, when a user starts up the display apparatus 30, initialization processing is performed, and the display control unit 114 displays a UI for labeling as illustrated in FIG. 9 or FIG. 10. The initialization processing includes processing for reading necessary data pieces from the learning data and the label and attribute information.

Next, in step S2002, the label and attribute information management unit 110 selects image data to be labeled by the user. In the selection, the user designates the image using the display condition setting portion 36 and the thumbnail image data display area 35 and presses the image switching button 40 to display the image on the labeling target image data 32. Alternatively, the user may randomly display images by pressing the image switching button 40 without designating the image.

Next, in step S2003, the label and attribute information management unit 110 receives the labeled result by the user. The user performs the labeling operation using the temporary storing button 39, the backward and forward button 41, the label transfer button 42, and the like.

Next, in step S2004, the label comparison unit 113 compares and confirms the labels. The label list 34 or the comparison target labeling image data 46 is used as previous labeled results in the comparison and confirmation. A calculation result of the similarity degree is displayed on the similarity degree display portion 37, and the user can confirm a difference from the label of the comparison target while watching the display. Regarding filtering and sorting of the data, the display condition setting portion 36 and thumbnail images may be used.

Next, in step S2005, the label and attribute information management unit 110 confirms whether labeling is completed. When the labeling is not yet completed (NO in step S2005), the processing returns to step S2003. When the labeling is completed (YES in step S2005), the processing proceeds to step S2006. When confirming completion of the labeling, the user presses the confirmation button 43 to confirm that there is no possibility of an error in the label.

Next, in step S2006, the label and attribute information management unit 110 registers and manages the image data by adding the attribute information such as the confidence degree of the user to the labeling. When the image data is registered, the label and attribute information management unit 110 associates the learning data with the label and the attribute information.

Next, in step S2007, the user determines whether to continue labeling on another image. When labeling is continued (YES in step S2007), the processing returns to step S2002. When labeling is not continued (NO in step S2007), the processing is terminated.

According to the present exemplary embodiment, a user can efficiently perform labeling while visually confirming another label and image data using a label similarity degree calculation function of the label comparison unit 113 and functions of comparing, referring, and editing a label by the UI using the display apparatus.

An information processing apparatus 30000 according to a third exemplary embodiment causes many labelers to perform labeling by crowdsourcing and determines a label with a high degree of accuracy from a large amount of labels. Further, the information processing apparatus 30000 appropriately extracts learning data to be processed by the labeler by calculating data of which a label is not determined in the learning data pieces and thus efficiently labels a large amount of learning data pieces.

Figure 12:
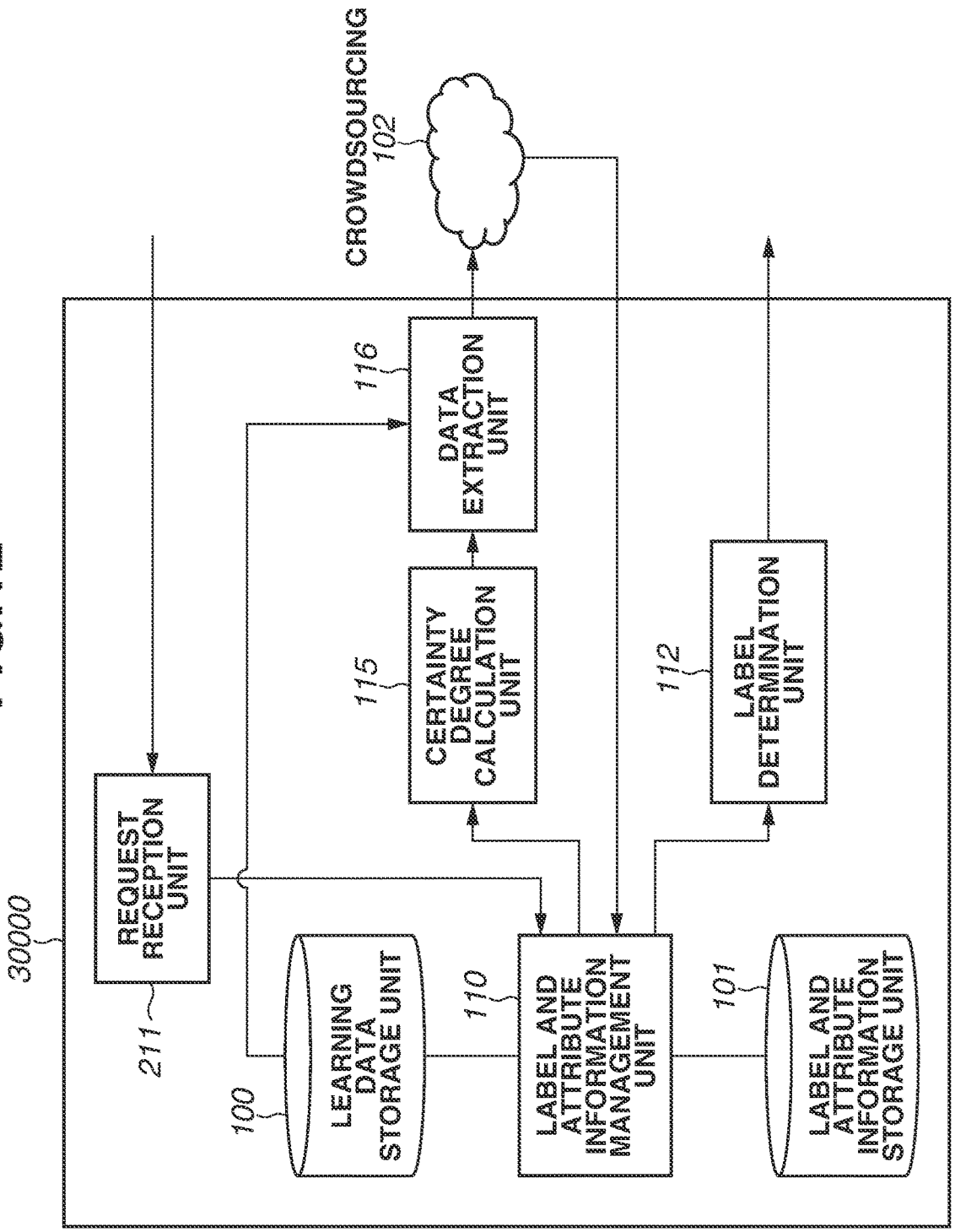
FIG. 12 is a block diagram illustrating an example of a configuration of a labeling system based on crowdsourcing according to one or more aspects of the present disclosure.

FIG. 12 is a functional block diagram illustrating a functional configuration of a labeling apparatus 30000 based on crowdsourcing according to the third exemplary embodiment. The functional configuration according to the third exemplary embodiment includes portions in common with the configuration according to the second exemplary embodiment illustrated in FIG. 8, so that crowdsourcing 102, a certainty degree calculation unit 115, and a data extraction unit 116 which are different from the second exemplary embodiment are described in detail.

The crowdsourcing 102 is constituted of many labelers who perform labeling, each labeler performs labeling on a learning data group extracted by the data extraction unit 116, and the label and attribute information management unit 110 stores and manages the labeled results in the label and attribute information. However, the third exemplary embodiment is not necessarily limited to the crowdsourcing 102 and may adopt outsourcing with particular people or cause a plurality of personal computers (PCs) to perform labeling in parallel.

The certainty degree calculation unit (certainty degree derivation unit) 115 receives the label and attribute information of each learning data from the label and attribute information management unit 110 and calculates a certainty degree as a degree of likelihood of a label determined by the label determination unit 112. The calculated certainty degree is stored as the data attribute information for each learning data. As the certainty degree is higher, the label determined by the label determination unit 112 has high likelihood which represents that no further labeling is necessary. When the certainty degree is low, it indicates that the label is highly likely wrong even the label determined by the label determination unit 112, and thus it is necessary to perform labeling by more labelers. Or, there is a possibility that the learning data itself is data to which a label is difficult to be uniquely determined.

The data extraction unit 116 extracts the learning data to be labeled by the labeler in the crowdsourcing 102 based on the certainty degree in the data attribute information for each learning data. Since labeling is less necessary for the learning data of which the certainty degree is high, the learning data is not easily extracted as data. In contrast, the learning data of which the certainty degree is low needs to improve the certainty degree by performing labeling and thus is easily extracted as data. The extracted learning data group is transferred to the crowdsourcing 102 to be labeled.

Next, a calculation method of a certainty degree (certainty degree derivation) by the certainty degree calculation unit 115 is described in detail below. A certainty degree F. is calculated by a following formula using the score S(j) of each label candidate calculated by the formula (1).

[Formula 3]

$$F = \frac{\max_j S(j)}{\sum_j S(j)} * W(n) \quad (3)$$

In the formula (3), a function W(n) determines a maximum value of the certainty degree F. in response to the number of labels. When a value n is small, the function W(n) will also be a small value, and when the value n is large, the function W(n) will also be a large value. However, an upper limit of the function w(n) is 1.0. The function W(n) is provided as described above so as not to easily output the high certainty degree F. when the total number of labels is small (when the value n is small). However, the calculation of the certainty degree is not limited to the above-described formula as long as a formula uses a fact that a ratio of the determined label is high. For example, a following formula may be used instead of the formula (3).

[Formula 4]

$$F = \frac{S[1] - S[2]}{S[1]} * W(n) \quad (4)$$

In the formula (4), a value S[x] is an x-th value when the score S(j) (j=1, ..., m) is arranged in descending order. In other words, a value S[1]=the max S(j), and a value S[m]=the min S(j). The certainty degree F. is calculated for each learning data as described above. However, when j>m, the score S[j]=0.

Next, a data extraction method by the data extraction unit 116 is described. Extraction of data is based on following three basic policies. (i) Data of which a certainty degree is low is extracted. (ii) Data of which the certainty degree remains low even the number of labels is increased is regarded as an exception. (iii) Test data to be used for evaluating reliability of a labeler is extracted. Each policy is described.

The policy (i) is because that as the certainty degree is lower, the data is subjected to labeling by a next labeler from a data group in the learning data so as to make a more correct label easier to be selected. The policy (ii) indicates that the learning data itself has a defect. The fact that the certainty degree is not increased even the number of labels is increased for certain learning data indicates that a plurality of peaks or no peak of the score S(j) exists in distribution of the score S(j) by the formula (3) or the formula (4). In such a case, it is highly likely that the learning data itself is an image difficult to be labeled, for example, a case is considered in which a target object is only partly captured in an image and indistinguishable to be labeled. In this case, an attribute for indicating that the data is difficult to be labeled is defined and registered to the data attribute information. Thus, data extraction is performed so as to make a request to a labeler having high reliability who can highly accurately perform labeling for labeling of the learning data which is difficult to be labeled, and accordingly an error in labeling can be reduced. In addition, the learning data which is difficult to be labeled may be excluded from target learning data to maintain a quality of the learning data group. The policy (iii) means a reliability evaluation data set for testing the reliability of the labeler. A data set for evaluating the reliability is prepared in advance which is constituted of data of which a true label is known and a data group with the high certainty degree, and the reliability evaluation data set is partly included in data pieces to be labeled by the labeler without the labeler's noticing. Subsequently, the reliability of the labeler can be obtained by evaluating how the labels applied to the reliability evaluation data set by the labeler are correct compared to the true labels. One of points requiring attention to crowdsourcing is incorporation of a false label by a malicious user. Using the reliability evaluation data set lowers the reliability of the labeler who applies a false label, so that if such a malicious user is included, an effect thereof can be suppressed. Further, when the initialization is performed (when labeling is started), the label and attribute information to the learning data is not defined at all, and the certainty degree is not set and zero with respect to all learning data pieces, so that the data extraction unit 116 may transfer data extracted by appropriately dividing all of the learning data pieces to the crowdsourcing 102. However, the behavior in the initialization is not limited to the above-describe one. At the time of initialization, some data pieces to be a model of labeling may be registered in advance, and data may be extracted using the data pieces as first label and attribute information and reliability evaluation data set.

Figure 13:
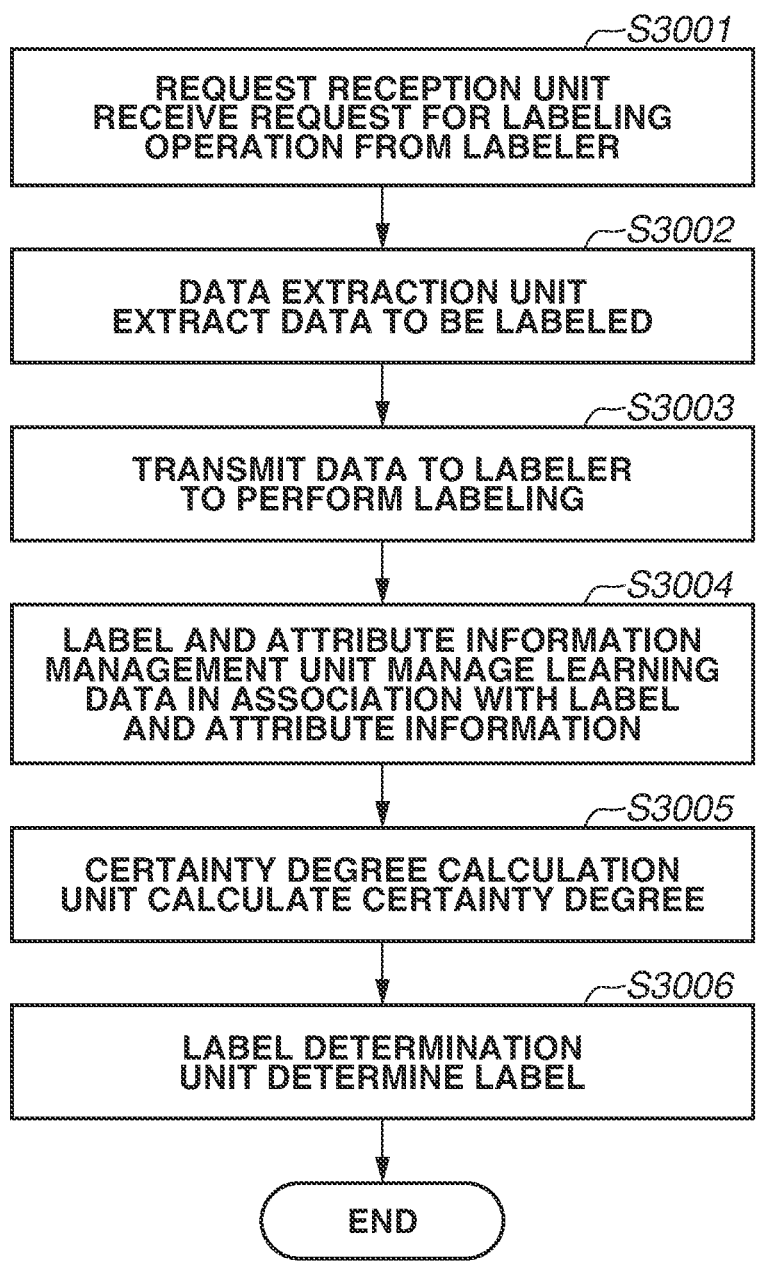
FIG. 13 is a flowchart illustrating a flow of labeling based on crowdsourcing according to one or more aspects of the present disclosure.

Next, a processing procedure of the information processing apparatus 30000 according to the present exemplary embodiment is described. FIG. 13 is a flowchart illustrating a flow of labeling based on the crowdsourcing. In step S3001, the request reception unit 211 receives a request to perform a labeling operation from the labeler in the crowdsourcing 102.

Next, in step S3002, the data extraction unit 116 extracts data to be labeled. Data may be extracted one by one or in a plurality of data groups together.

Next, in step S3003, the extracted data is transferred to the labeler in the crowdsourcing 102 to perform labeling. The labeling procedure may be performed by following the flowchart already described in FIG. 11.

Next, in step S3004, the label and attribute information management unit 110 obtains the label and the attribute information from the crowdsourcing 102 and manages them in association with the learning data. A detail processing flow in step S3004 may be performed by following the flowchart described in FIG. 6.

Next, in step S3005, the certainty degree is calculated for each learning data using the certainty degree calculation unit 115. The calculated certainty degree is updated as the data attribute information with respect to the learning data.

Next, in step S3006, the label is determined using the label determination unit 112. The label determination flow may be performed by following the flowchart already described in FIG. 7.

The processing is described to be performed in the order illustrated in the flowchart in FIG. 13, however the order is not limited to the above-described one, and, for example, the determination of the label in step S3006 is calculated using the score S(j) in the formula (1) as with the certainty degree in step S3005, so that the label may be determined at the same time when the certainty degree is calculated. In addition, some use cases require the determined label if the label is not necessarily determined. In such a case, the processing in the flowchart in FIG. 7 may be executed at an arbitrary timing independent from the processing in the flowchart in FIG. 13 using the certainty degree.

According to the present exemplary embodiment, the certainty degree indicating whether the label is determined is calculated, and data is extracted from data of which the label is not determined, so that the learning data which is necessary to be labeled can be efficiently selected and transferred to the cloud. In addition, the reliability evaluation data set is included in the data to be extracted, and accordingly a harmful effect such as incorporation of a labeling error by a malicious user in the crowdsourcing can be minimized.

An information processing apparatus 40000 according to a fourth exemplary embodiment determines a label with fewer errors from a large amount of labels by crowdsourcing, performs learning using the label with fewer errors, and thus can highly accurately perform recognition.

Figure 14:
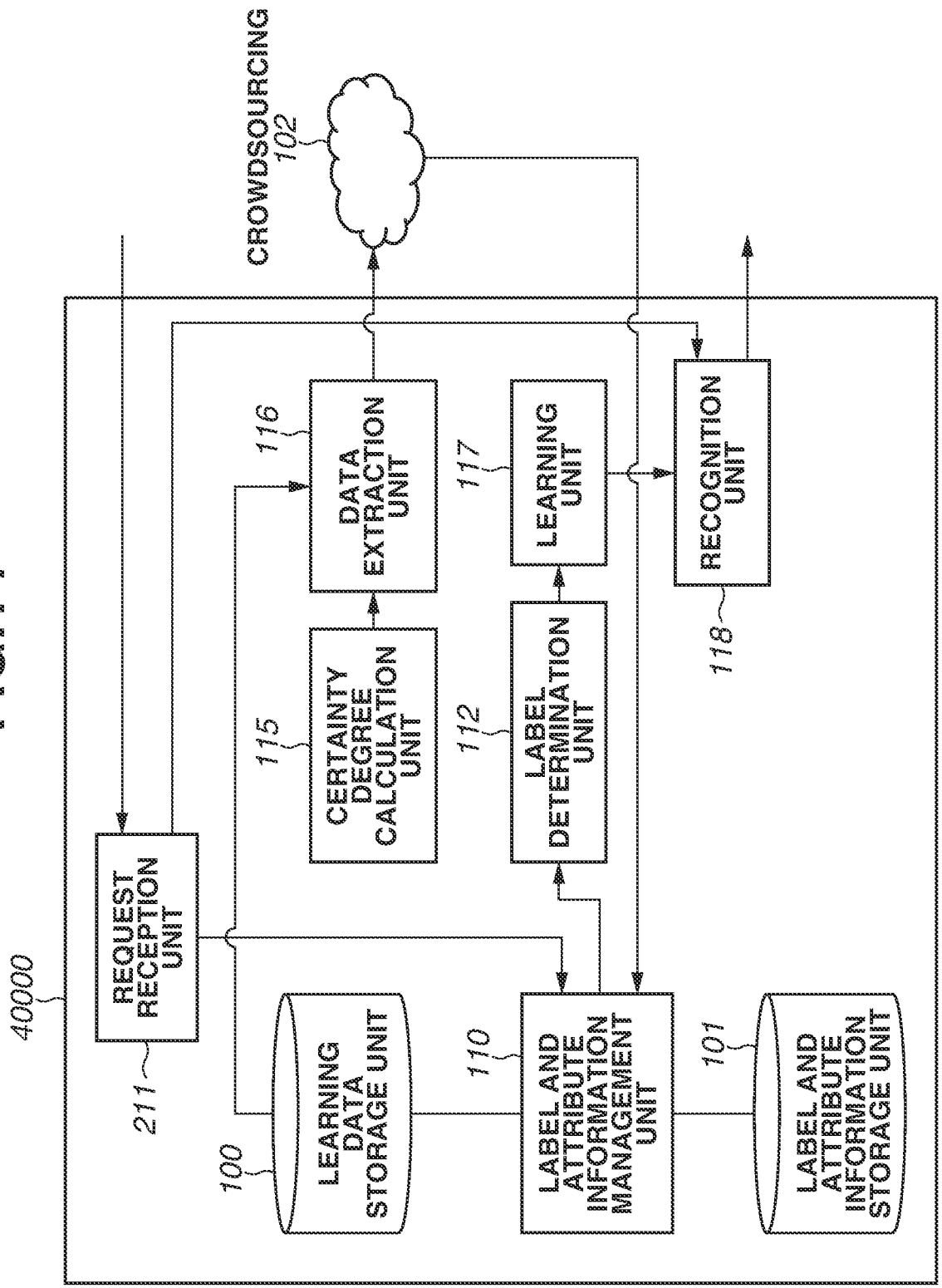
FIG. 14 is a block diagram illustrating an example of a configuration of a learning and recognition system based on crowdsourcing according to one or more aspects of the present disclosure.

FIG. 14 is a functional block diagram illustrating a functional configuration of the information processing apparatus 40000 according to the fourth exemplary embodiment. The functional configuration according to the fourth exemplary embodiment includes portions in common with the example of the configuration according to the third exemplary embodiment illustrated in FIG. 12, so that a learning unit 117 and a recognition unit 118 which are different from the third exemplary embodiment are described in detail.

The learning unit 117 receives the label determined by the label determination unit 112 and the learning data by making a request to the request reception unit 211 and performs supervised learning using the label corresponding to the learning data as a teacher. The learning method is not particularly limited, and deep learning and random forest may be used. As data to be used in the learning, only data of which the certainty degree is greater than or equal to a threshold value is used. Accordingly, the learning can be performed by labels with fewer errors, and a highly accurate prediction model can be generated. However, data is not limited to the above-described one, and the learning may be performed using all of the learning data pieces. The learning can be performed at an arbitrary timing if the determined label corresponding to the learning data can be obtained.

When receiving the prediction model from the learning unit 117 and the query data from the request reception unit 211, the recognition unit 118 returns a predicted result (an output label) based on the prediction model. The output label is used for comparison with another label in the label comparison unit 113, displayed by the display control unit 114 with the other label, and referred to when the certainty degree calculation unit 115 determines the certainty degree. For example, the display control unit 114 causes the display apparatus 30 to display comparison with the output label during editing of the label and thus can prompt a user to correct the label.

Next, a calculation method of the certainty degree when the output label is obtained by the certainty degree calculation unit 115 is described. Regarding the calculation method, the certainty degree F. is already calculated by the formula (3) or the formula (4). When the output label is known, a formula B (I_d, I_o) is further added to the formula. In this regard, "I_d" and "I_o" respectively represent the determined label and the output label. The formula B indicates a similarity degree with a larger value when "I_d" and "I_o" are the same and a similarity degree with a smaller value when "I_d" and "I_o" are different. According to the present exemplary embodiment, it is described that the formula B (I_d, I_o) is added to the formula (3) or the formula (4) for the calculation of the certainty degree. However, the calculation method is not limited to this, and the certainty degree may be calculated by multiplying the formula (3) or the formula (4) by the formula B (I_d, I_o). In addition, it is described that the certainty degree calculation unit 115 determines the determined label after calculating the certainty degree with reference to FIG. 13. In this regards, the label may be determined as a tentatively determined label before the certainty degree is determined, and when the tentatively determined label is equal to the output label, and the certainty degree is high, the tentatively determined label may be finally regarded as the determined label.

Figure 15:
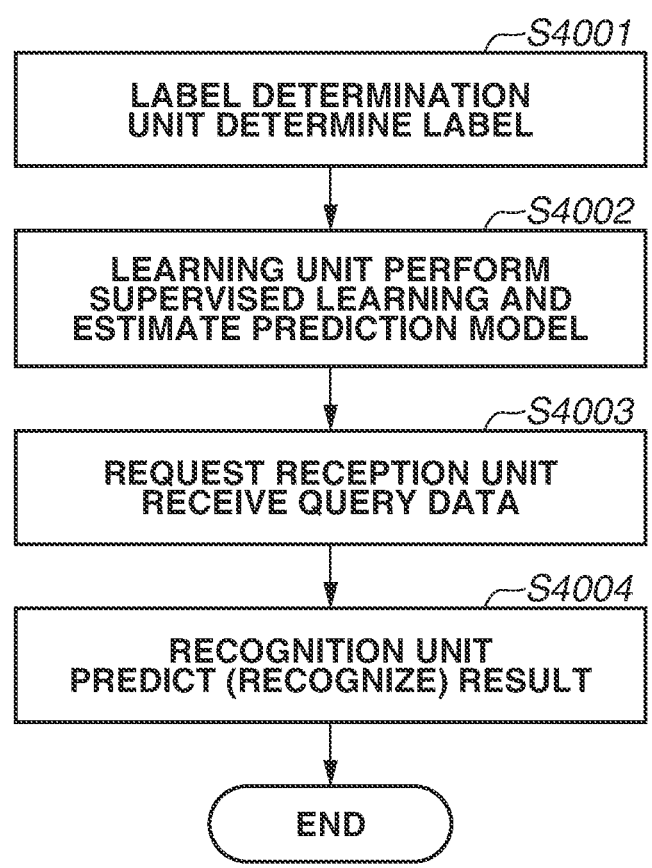
FIG. 15 is a flowchart illustrating a flow of learning and recognition based on crowdsourcing according to one or more aspects of the present disclosure.

Next, a processing procedure of the information processing apparatus 40000 according to the present exemplary embodiment is described. FIG. 15 illustrates a flow of learning and recognition by the crowdsourcing. In step S4001, the label determination unit 112 determines the label using the flow illustrated in FIG. 13 as with the third exemplary embodiment. In step S4001, labeling is completed to a stage at which the label of data to be subjected to learning can be determined in the learning data. In addition, it is confirmed not only that the determined label is applied to the learning data, but also the certainty degree of each learning data is greater than or equal to a constant value depending on a condition.

Next, in step S4002, the learning unit 117 performs the supervised learning using the determined label corresponding to the learning data and estimates the prediction model.

Next, in step S4003, the request reception unit 211 receives the query data and transmits the query data to the recognition unit 118. The query data has a format similar to that of the learning data and is, for example, an image file. The image file is obtained by an image obtainment unit, which is not illustrated. Step S4003 is an event which can occur at an arbitrary timing when the prediction model is generated and not necessarily to be executed after step S4002 once the prediction model is generated in step S4002.

Next, in step S4004, the recognition unit 118 predicts (recognizes) a result with respect to the query data based on the prediction model obtained in the previous processing. The predicted result has a form similar to that of the label. For example, in the case of the symbol designation type, the recognition unit 118 predicts (recognizes) that an animal captured in the query data is a "cat", and in the case of the area designation type, the recognition unit 118 predicts, for example, a result in which only a face area of an object is filled with color. In addition, in the case of the numerical value designation type, the recognition unit 118 predicts a matrix and quaternion indicating a posture of a target object. The predicted (recognized) result may be returned to use the recognition unit 118 as a recognition system or to improve the calculation in the certainty degree calculation unit 115. Further, the predicted (recognized) result may be used as a comparison target in the display control unit 114.

The learning unit 117 and the recognition unit 118 are described according to the present exemplary embodiment having the configuration in which the learning unit 117 and the recognition unit 118 are added to the information processing apparatus according to the third exemplary embodiment, however the configuration is not limited to this, and the learning unit 117 and the recognition unit 118 may be included in the first exemplary embodiment and the second exemplary embodiment in the similar manner.

According to the present exemplary embodiment, a prediction model is generated by performing learning using labels with fewer errors determined by the label determination unit, and the prediction model is used to perform recognition, so that the recognition can be highly accurately performed. Further, a certainty degree is calculated with a high degree of accuracy using the recognition result, and accordingly, a more reliable determined label can be obtained, and accuracy in data extraction can be improved. In addition, the display control unit 114 displays the recognition result to be compared with a label being edited, and thus a labeler can be helped to reduce an error in labeling.

An information processing apparatus 50000 according to a fifth exemplary embodiment has a function of comparing a label applied by a labeler with an existing label and evaluating a reliability of the labeler. Evaluating the labeler with a high degree of accuracy leads to appropriately pay a reward for a labeling operation and improve motivation and work efficiency of the labeler himself or herself. In addition, a malicious labeler who intends to apply a false label can be identified.

Figure 16:
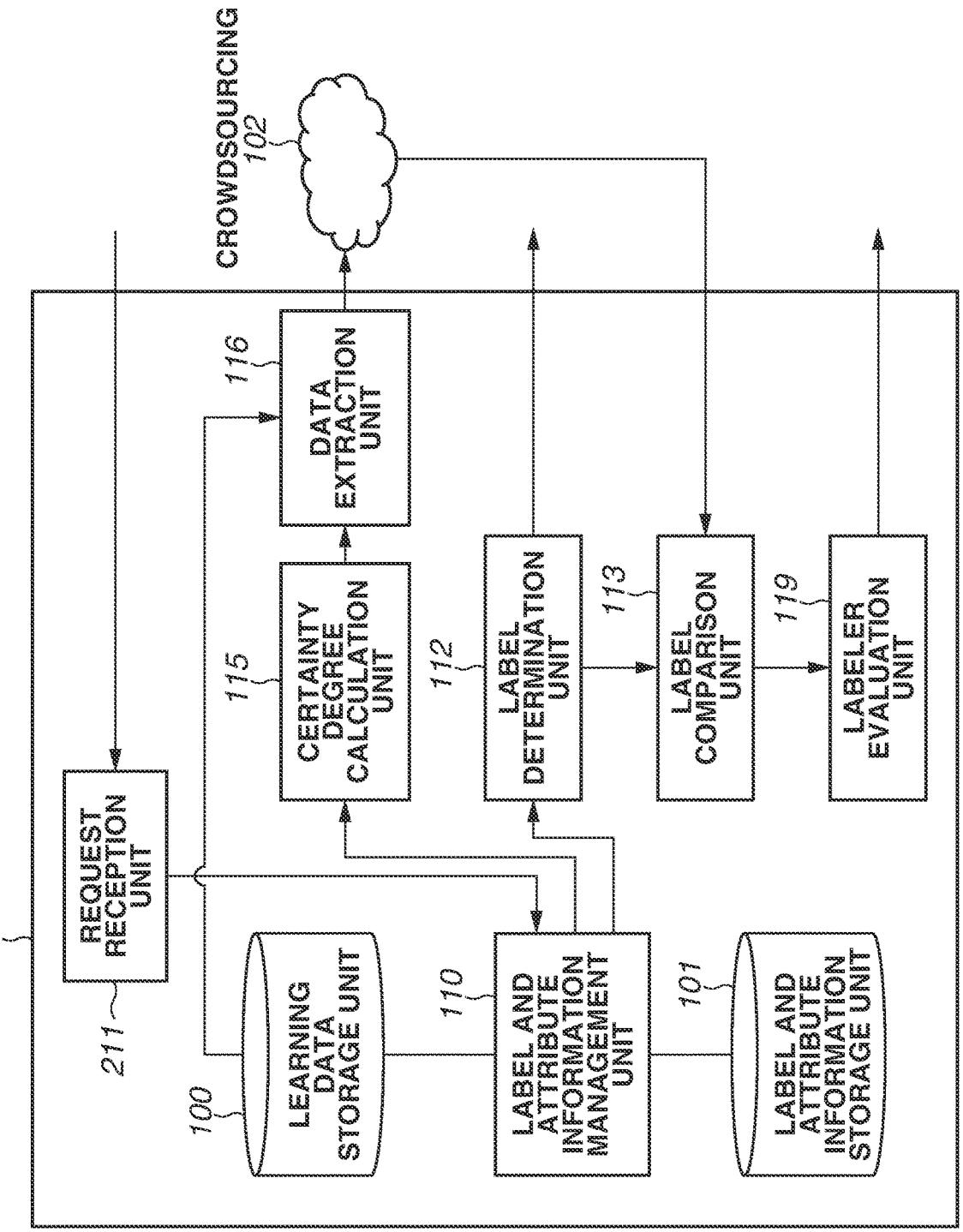
FIG. 16 is a block diagram illustrating an example of a configuration of a labeler evaluation system according to one or more aspects of the present disclosure.

FIG. 16 is a block diagram illustrating an example of a configuration of the information processing apparatus 50000 according to the fifth exemplary embodiment. The example of the configuration according to the fifth exemplary embodiment includes portions in common with the example of the configuration according to the second exemplary embodiment illustrated in FIG. 8, so that a labeler evaluation unit (label evaluation unit) 119 which is different from the second exemplary embodiment is described. The information processing apparatus 50000 according to the fifth exemplary embodiment does not include the display control unit 114 compared to the information processing apparatus 20000 according to the second exemplary embodiment illustrated in FIG. 8, however an evaluation result by the labeler evaluation unit 119 may be displayed on the display apparatus 30 via the display control unit 114.

The labeler evaluation unit 119 compares a label newly applied by a labeler with the determined label or the output label and evaluates the newly applied label. Further, the labeler evaluation unit 119 evaluates the labeler based on an evaluation with respect to an entire label group applied by the labeler. When the labeler is evaluated, the reliability of the labeler can be calculated more accurately, and accordingly, an error in the determined label can be reduced. In addition, the evaluation can be used as a factor for determining a reward to the labeler in the crowdsourcing 102.

First, a label evaluation method is described. The label newly applied by the labeler is evaluated by calculating a similarity degree using the label comparison unit 113 with respect to the determined label calculated by the label determination unit 112 or the output label calculated using the prediction model by the recognition unit 118. A calculation method of the similarity degree is the same as that described according to the second exemplary embodiment. An evaluation value is determined in a range from zero to one so that the evaluation becomes higher as the similarity degree is higher such as the evaluation value equal to the similarity degree. It is considered that the determined label and the output label are ideally the same label, the similarity degree may be calculated with respect to any of them, or the similarity degree may be calculated to both of them, and an average value of the similarity degrees may be regarded as the evaluation value. However, when the determined label and the output label are widely different from each other, it is possible that the attribute information includes an inadequate setting in the calculation of the formula (1) by the label determination unit 112, and the learning of the prediction model by the learning unit 117 has failed. In such a case, the newly applied label cannot be correctly evaluated, so that the evaluation of the label to the learning data is invalidated.

Next, a labeler evaluation method is described. A reward parameter Rw and a reliability R of a labeler are calculated. The label applied by the labeler using the above-described method is given the above-described evaluation value $v(k)$ ($k=1, \ldots, p$) based on the similarity degree for each learning data expecting the label of which the evaluation is invalidated. Further, the reward parameter Rw of the labeler is calculated by a following formula.

$$Rw = \Sigma k f(r) * v(k) \qquad (5)$$

The formula (5) includes the monotonically increasing function f and the reliability R of the labeler used in the formula (1). For example, $f(R)=1+R$. Further, the reliability R can be calculated by a formula (6) described below. A reward of the labeler in the crowdsourcing is determined based on the reward parameter Rw of the labeler. During when the labeling is continuously performed on the learning data, the determined label, the prediction model, and the like change at any time, so that if the reward parameter Rw is calculated in that stage, the calculated parameter is not always correct. Therefore, the reward parameter Rw can be defined from a label applied to data regarded as labeling is completed with respect to the learning data. However, the reliability R of the labeler at that time is used. The reward parameter Rw may be added for each data on which labeling is completed one after another as shown in the formula (5). Next, the reliability R of the labeler is calculated by a following formula.

$$R = W(p) * \Pi k v(k) \qquad (6)$$

In the formula (6), a function $W(p)$ is similar to the function $W(n)$ in the formula (3) and has a value from zero to one for determining a maximum value of the reliability R according to the number p of the evaluation values. The calculated reliability R of the labeler is updated as the labeler attribute information. When the reliability R of the labeler is less than a threshold value, the labeler is recognized as a malicious labeler who always applies a false label, and the label applied by the labeler is disregarded or deleted. In addition, a countermeasure may be taken in which a weight coefficient to the reward parameter Rw is extremely reduced. In contrast, when the reliability R of the labeler is greater than or equal to the threshold value, the value of the score S(j) determined in the formula (1) becomes larger, and the labeler has a greater influence on the determined label and the certainty degree calculated by the label determination unit 112 and the certainty degree calculation unit 115.

The reliability R of the labeler is calculated from the labeled result as described above, and thus the malicious labeler who applies a false label can be easily identified. Further, when the label is determined, the label applied by the labeler having the higher reliability is prioritized, and thus the accuracy of the label is improved. In addition, a labeler whose labeling accuracy occasionally changes without malice may be alerted when the reliability R is reduced. Accordingly, the labeler can be notified of an educational benefit for correct labeling and prevention of a careless mistake.

Figure 17:
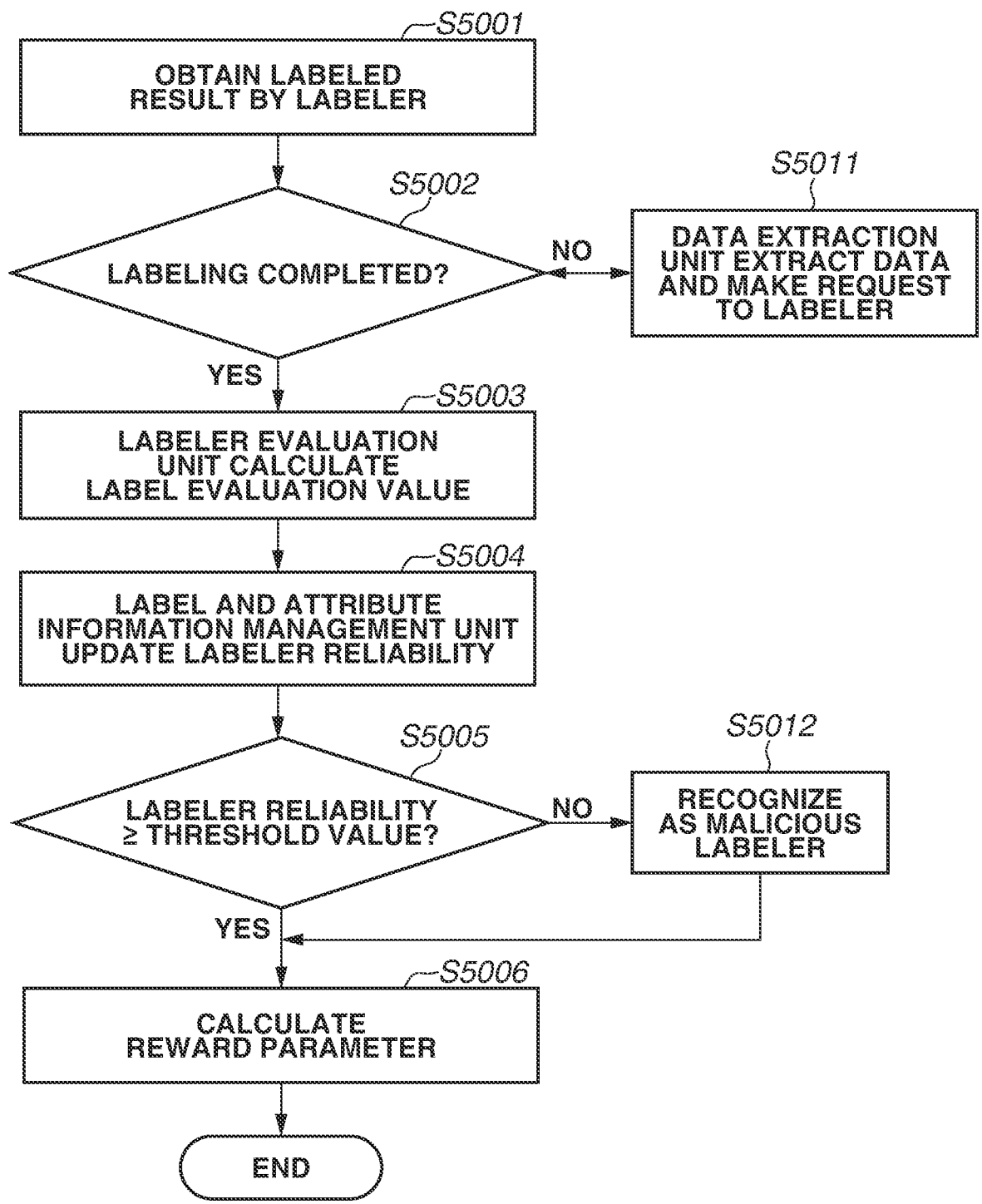
FIG. 17 is a flowchart illustrating a flow for evaluating a labeler using the labeler evaluation system according to one or more aspects of the present disclosure.

Next, a processing procedure of the information processing apparatus 50000 according to the present exemplary embodiment is described with reference to FIG. 17. First, in step S5001, a target labeler performs labeling.

Next, in step S5002, it is determined whether labeling is completed on target learning data. A criterion of labeling completion is either or both of that the certainty degree is greater than or equal to the threshold value, and that the similarity degree between the determined label and the output label is high. When the labeling is not completed (NO in step S5002), the processing proceeds to step S5011, and when the labeling is completed (YES in step S5002), the processing proceeds to step S5003.

Next, in step S5003, the labeler evaluation unit 119 calculates a label evaluation value based on the similarity degree calculated by the label comparison unit 113.

Next, in step S5004, the labeler evaluation unit 119 calculates the reliability of the labeler based on the formula (6), and the label and attribute information management unit 110 updates the labeler reliability.

Next, in step S5005, it is determined whether the labeler reliability is greater than or equal to the threshold value. When the labeler reliability is less than the threshold value (NO in step S5005), the processing proceeds to step S5012, and when the labeler reliability is greater than or equal to the threshold value (YES in step S5005), the processing proceeds to step S5006.

Next, in step S5006, the reward parameter Rw is calculated based on the formula (5).

In step S5011, the data extraction unit 116 repeatedly extracts data and requests the labeler to perform labeling until the labeling is completed. However, the data extraction unit 116 is not limited to a method for extracting one piece of data at a time, and the data extraction unit 116 may first extract data pieces as a whole and requests the labeler to perform labeling until there is no more data.

In step S5012, when the labeler reliability is less than the threshold value, the labeler is recognized as the malicious labeler, so that information of the label applied by the labeler is deleted, a weight thereof is reduced, and the function f(R) in the formula (5) is set to zero or a very small value.

According to the present exemplary embodiment, the labeler is evaluated based on the labeled result, and the labeler reliability is updated, so that a label which is more reliable and has less possibility of error can be obtained. In addition, the reward of the labeler is determined based on the evaluation of the labeler, so that improvement of motivation and work efficiency of the labeler can be expected. Further, the malicious labeler is identified, and thus harmful effects on determination of the label and generation of the prediction model can be reduced.

The configuration of the information processing apparatus according to each of the above-described exemplary embodiments can be used in appropriate combination.

If a false label is applied to learning data, the label can be appropriately determined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-249170, filed Dec. 22, 2016, which is hereby incorporated by reference herein in its entirety.

What is claimed is:

1. An information processing apparatus which processes learning data used in learning of a dictionary for performing predetermined recognition, the information processing apparatus comprising:

an obtaining unit configured to obtain information of a plurality of labels applied to the learning data by a plurality of users, information regarding confidence which indicates a degree of correct labeling by the user and is judged by the user, and information regarding reliability which indicates a degree of correctness of the label applied by the user, wherein the information of the label is information regarding a result to be recognized in a case where the predetermined recognition is performed on the learning data; and a determination unit configured to, based on the information regarding the confidence obtained by the obtaining unit and the information regarding the reliability obtained by the obtaining unit, determine the label applied to the learning data from among a plurality of candidates, the plurality of candidates being the plurality of labels applied to the learning data by the plurality of users.

2. The information processing apparatus according to claim 1, further comprising an evaluation unit configured to derive an evaluation value for each of the plurality of labels applied to the learning data,
wherein the determination unit determines a label to the learning data based on the evaluation value.

3. The information processing apparatus according to claim 1, wherein the determination unit determines a label to the learning data further based on a likelihood of a result that a classifier for identifying a label of learning data applies to the learning data.

4. The information processing apparatus according to claim 1, further comprising a display control unit configured to display the plurality of labels applied to the learning data on a display apparatus.

5. The information processing apparatus according to claim 4, further comprising a label comparison unit configured to compare a first label and a second label in the plurality of labels applied to the learning data,
wherein the display control unit displays a result compared by the label comparison unit on the display apparatus.

6. The information processing apparatus according to claim 5, wherein
the label comparison unit calculates a similarity degree or a coincidence degree between the plurality of labels, and
the display control unit displays a derived similarity degree or a derived coincidence degree.

7. The information processing apparatus according to claim 4, wherein the display control unit has a function of displaying the label by filtering or sorting based on the reliability of the label itself.

8. The information processing apparatus according to claim 4, wherein the display control unit has a function of displaying the label by filtering or sorting based on the reliability of the user who applies the label.

9. The information processing apparatus according to claim 4, wherein the display control unit displays another labeled learning data piece related to learning data which a user labels on the display apparatus.

10. The information processing apparatus according to claim 1, further comprising a certainty degree derivation unit configured to calculate a certainty degree representing a likelihood of the determined label based on the reliability of the label itself.

11. The information processing apparatus according to claim 10, further comprising a learning unit configured to learn a prediction model based on the determined label; and
a recognition unit configured to perform recognition using the prediction model.

12. The information processing apparatus according to claim 11, wherein the certainty degree derivation unit derives a certainty degree based on a result recognized by the recognition unit.

13. The information processing apparatus according to claim 10, further comprising a data extraction unit configured to extract a data group regarding which a request for labeling is made from among a learning data group based on the certainty degree.

14. The information processing apparatus according to claim 13, wherein the data extraction unit extracts data of which a certainty degree is low.

15. The information processing apparatus according to claim 14, wherein the data extraction unit extracts the data group so that the data group includes a predetermined number or more pieces of learning data which are already labeled.

16. The information processing apparatus according to claim 1, further comprising a label evaluation unit configured to evaluate labeling applied to the learning data based on a calculated result of a similarity degree between the label applied to the learning data and the label determined by the determination unit.

17. The information processing apparatus according to claim 16, wherein a label evaluation unit derives reliability of a person or an algorithm which performs labeling based on the label evaluated by the label evaluation unit.

18. A method of information processing for processing learning data used in learning of a dictionary for performing predetermined recognition, the method comprising:
obtaining information of a plurality of labels applied to the learning data by a plurality of users, information regarding confidence which indicates a degree of correct labeling by the user and is judged by the user, and information regarding reliability which indicates a degree of correctness of the label applied by the user, wherein the information of the label is information regarding a result to be recognized in a case where the predetermined recognition is performed on the learning data; and
determining, based on the information regarding the confidence obtained by the obtaining unit and the information regarding the reliability obtained by the obtaining unit, the label applied to the learning data from among a plurality of candidates, the plurality of candidates being the plurality of labels applied to the learning data by the plurality of users.

19. A non-transitory storage medium storing a program for causing a computer to execute each step in a method of information processing for processing learning data used in learning of a dictionary for performing predetermined recognition, the method comprising:
obtaining information of a plurality of labels applied to the learning data by a plurality of users, information regarding confidence which indicates a degree of correct labeling by the user and is judged by the user, and information regarding reliability which indicates a degree of correctness of the label applied by the user, wherein the information of the label is information regarding a result to be recognized in a case where the predetermined recognition is performed on the learning data; and
determining, based on the information regarding the confidence obtained by the obtaining unit and the information regarding the reliability obtained by the obtaining unit, the label applied to the learning data from among a plurality of candidates, the plurality of candidates being the plurality of labels applied to the learning data by the plurality of users.

* * * * *